United States Patent
Yoshida

(10) Patent No.: US 10,698,273 B2
(45) Date of Patent: Jun. 30, 2020

(54) IMAGE DISPLAY DEVICE

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/451,184

(22) Filed: Jun. 25, 2019

(65) Prior Publication Data
US 2020/0004075 A1 Jan. 2, 2020

Related U.S. Application Data

(60) Provisional application No. 62/691,665, filed on Jun. 29, 2018.

(51) Int. Cl.
| | |
|---|---|
| G09G 3/36 | (2006.01) |
| G09G 3/30 | (2006.01) |
| G02F 1/1345 | (2006.01) |
| G02F 1/1333 | (2006.01) |
| G02F 1/1368 | (2006.01) |
| G02F 1/133 | (2006.01) |
| G02F 1/1362 | (2006.01) |

(52) U.S. Cl.
CPC ........ *G02F 1/13454* (2013.01); *G02F 1/1368* (2013.01); *G02F 1/13306* (2013.01); *G02F 1/133308* (2013.01); *G02F 1/133345* (2013.01); *G02F 1/136286* (2013.01); *G09G 3/3677* (2013.01); *G09G 2300/0408* (2013.01); *G09G 2300/0426* (2013.01); *G09G 2300/08* (2013.01)

(58) Field of Classification Search
CPC .... G09G 3/30–3291; G09G 2300/0404–0895; G09G 2320/0214–0223; G09G 2320/028
See application file for complete search history.

(56) References Cited

U.S. PATENT DOCUMENTS

| | | | |
|---|---|---|---|
| 2007/0080917 A1* | 4/2007 | Koyama | ............. H01L 27/3276 345/92 |
| 2009/0185093 A1* | 7/2009 | Gao | ...................... G02F 1/1345 349/42 |
| 2012/0162179 A1 | 6/2012 | Tanaka et al. | |

(Continued)

FOREIGN PATENT DOCUMENTS

| | | |
|---|---|---|
| JP | 2016-186649 A | 10/2016 |
| WO | 2011/036911 A1 | 3/2011 |

*Primary Examiner* — Sanghyuk Park
(74) *Attorney, Agent, or Firm* — Keating & Bennett, LLP

(57) ABSTRACT

The image display device of the present invention includes a substrate. The substrate includes: a first metal layer, a first insulating layer, a second metal layer, a second insulating layer, and a third metal layer stacked in the stated order; a scanning signal line; and a gate driver. The gate driver includes a unit circuit including an output control transistor. The scanning signal line is provided in the second metal layer in the display region. The substrate includes a first additional line electrically connected to a gate electrode of the output control transistor. The first additional line includes a first additional line portion provided in the first metal layer in the display region. The first additional line portion overlaps the scanning signal line in the display region via the first insulating layer.

12 Claims, 14 Drawing Sheets

(56) References Cited

U.S. PATENT DOCUMENTS

2015/0293546 A1 10/2015 Tanaka et al.
2016/0370635 A1 12/2016 Tanaka et al.
2018/0011504 A1 1/2018 Tanaka et al.
2018/0261627 A1* 9/2018 An ...................... G09G 3/3648

* cited by examiner

IMAGE DISPLAY DEVICE

CROSS-REFERENCE TO RELATED APPLICATIONS

The present application claims priority under 35 U.S.C. § 119 to U.S. Patent Application No. 62/691,665 filed on Jun. 29, 2018, the contents of which are incorporated herein by reference in their entirety.

BACKGROUND OF THE INVENTION

Field of the Invention

The present invention relates to an image display device. More particularly, the present invention relates to an image display device including a gate driver monolithically provided on an insulating substrate.

Description of Related Art

As one of the image display devices, an active matrix liquid crystal display device which includes a display region including multiple video signal lines (data lines) and multiple scanning signal lines (gate lines) is known. Generally, an active matrix liquid crystal display device displays an image by selecting pixels arranged in a matrix in units of row and writing a voltage corresponding to display data to the selected pixels. Conventionally, in such a liquid crystal display device, a gate driver (scanning signal line drive circuit) for driving a scanning signal line is often mounted as an integrated circuit (IC) chip in a peripheral portion of a substrate constituting a liquid crystal display panel to select pixels in units of row. A shift register is provided in the gate driver for sequentially shifting an output signal (scanning signal) based on a clock signal. However, in recent years, in order to achieve reduction in size and cost of the liquid crystal display device, the gate driver is sometimes provided monolithically on a thin-film transistor (TFT) substrate (array substrate) which is one of two glass substrates constituting the liquid crystal display panel.

As an image display device including a (monolithicated) gate driver provided monolithically on an array substrate, for example, WO 2011/36911 discloses a liquid crystal display device in which, in a region outside a display region of a region on the array substrate, a third metal is formed as a metal film in addition to a source metal for forming a conductive line pattern including a source electrode of a thin-film transistor provided in a pixel circuit and a gate driver and a gate metal for forming a conductive line pattern including a gate electrode of the thin-film transistor, and the third metal is electrically connected to at least one of the source metal and the gate metal via a contact.

Further, JP 2016-186649 A discloses a liquid crystal display device in which a gate line group and a source line group are formed on an active matrix substrate, the active matrix substrate has multiple switching elements, at least a part of the switching elements are formed in a pixel region, and a gate driver for outputting a scanning signal to a gate line and a conductive line for supplying a control signal to the gate driver are formed.

BRIEF SUMMARY OF THE INVENTION

The gate driver provided monolithically on the array substrate is also referred to as a gate driver monolithic (GDM) circuit. In an image display device provided with the GDM circuit, reducing a region (frame region) in which the GDM circuit is arranged is difficult, particularly in the case of a high definition model. The reason will be described below by taking the liquid crystal display device of Comparative Embodiment 1 as an example.

FIG. 15 is a schematic plan view showing a periphery of a unit circuit included in the gate driver of the liquid crystal display device of Comparative Embodiment 1. A liquid crystal display device 1R of Comparative Embodiment 1 includes a GDM circuit. Multiple scanning signal lines (not shown) are arranged in a display region AR at intervals of approximately 60 μm on the array substrate provided in the liquid crystal display device 1R of Comparative Embodiment 1. In a frame region NR, which is a region outside the display region AR, a drive circuit region BR and a drive signal main line region CR are provided. The drive circuit region BR is a region in which the shift register is arranged, and the drive signal main line region CR is a region in which a conductive line for inputting a drive signal to the shift register is arranged. In the drive circuit region BR, one initialization line L1R and multiple unit circuits 10BR constituting a shift register are arranged, and in the drive signal main line region CR, four clock lines L2R, one low potential line L3R, and two start signal lines L4R are arranged.

Each of the unit circuits 10BR included in the shift register includes an output control TFT for outputting a scanning signal to a corresponding scanning signal line among the scanning signal lines, and a capacitor (hereinafter, also referred to as a bootstrap capacitor) formed between a gate electrode (node A) and a drain electrode (a terminal connected to the output terminal) of the output control TFT.

This bootstrap capacitor is installed for the purpose of raising the potential of the node A in order to facilitate the flow of current between the source electrode and the drain electrode of the output control TFT when an on-signal is output from the output control TFT to the scanning signal line. In the case of a GDM circuit including a TFT using amorphous silicon (hereinafter referred to as a-Si) or an InGaZnO oxide semiconductor, in the same manner as in an output control transistor region DR in which the output control TFT is formed, the size of a bootstrap capacitor region CapAR in which a bootstrap capacitor is formed is large, which is a limitation of the frame design.

Here, a region occupied in the Y direction (vertical direction in the drawing) of each stage (each unit circuit 10BR) of the GDM circuit is limited corresponding to the Y pitch (vertical pitch) of the pixels. For example, in the liquid crystal display device 1R of Comparative Embodiment 1, the size is approximately 60 μm. Therefore, particularly in a high definition model, when a large bootstrap capacitor is secured, the region in the X direction (left and right direction in the drawing) tends to be wide, and it may be difficult to reduce the frame region NR.

FIG. 1 of WO 2011/36911 discloses an aspect in which the third metal is arranged below the gate metal (gate metal layer) via the insulating film, and the third metal is used to form a bootstrap capacitor in a portion overlapping the output control TFT.

In the liquid crystal display device disclosed in FIG. 1 of WO 2011/36911, although a third metal is newly added to the lower layer of the gate metal or the upper layer of the source metal, and an output control TFT portion forms the bootstrap capacitor by using the metal, the capacitance may be insufficient only by the relevant portion. The magnitude of the bootstrap capacitor varies depending on the voltage of the drive circuit, pixel design, or the like. For example, in the 4.95-type FHD (full high-definition) liquid crystal display device, all regions specialized for forming the bootstrap capacitor are removed. When the bootstrap capacitor is formed in the output control TFT portion by using the technique of WO 2011/36911, estimation is made that the capacitance of approximately 20% is insufficient. Since a region specialized for forming a bootstrap capacitor needs to be left for the capacitance of 20% as in the prior art, there is still room for improvement in reducing the frame region.

JP 2016-186649 A discloses that, in the liquid crystal display device disclosed in FIG. 3 and FIG. 5B, for example, at least a part of the gate driver (a thin-film transistor or the like as a switching element) is arranged in a pixel region (corresponding to a display region), and thereby the frame can be narrowed compared to the case where all the gate drivers are arranged outside the pixel region. However, the gate driver provided in the liquid crystal display device of JP 2016-186649 A is arranged between the gate line and the gate line in the display region, and an aperture ratio of the display region may be reduced.

The present invention has been made in view of such a current state of the art and aims to provide an image display device capable of reducing a frame region and suppressing a reduction in the aperture ratio of the display region while providing at least a part of a gate driver monolithically in the frame region.

The inventor of the present invention has variously examined an image display device capable of reducing a frame region and suppressing a reduction in the aperture ratio of the display region while providing at least a part of a gate driver monolithically in the frame region. Thus, the inventor has paid attention to providing a new metal layer in addition to the source metal layer and the gate metal layer. The inventor has found that, in the display region, an additional line electrically connected to the gate electrode of the output control transistor is arranged in the new metal layer so as to overlap the scanning signal line provided in the gate metal layer, and thereby the bootstrap capacitor can be formed not in the gate driver provided in the frame region but in the region overlapping the scanning signal line of the display region. Thereby, the inventor has arrived at the solution to the above problem, completing the present invention.

(1) One embodiment of the present invention is an image display device including: a substrate, a display region that has multiple display units arranged in a matrix and displays an image, and a frame region that is a region outside the display region, wherein the substrate includes: an insulating substrate; a first metal layer, a first insulating layer, a second metal layer, a second insulating layer, and a third metal layer stacked in the stated order on the insulating substrate; a pixel electrode provided in the display region; a pixel control transistor provided in the display region and electrically connected to the pixel electrode; a scanning signal line electrically connected to a gate electrode of the pixel control transistor; and a gate driver provided monolithically on the insulating substrate in the frame region and configured to drive the scanning signal line, the gate driver includes a unit circuit including: a clock terminal to which a clock signal is input; an output terminal electrically connected to the scanning signal line and configured to output a scanning signal to the scanning signal line; and an output control transistor with one of a source electrode and a drain electrode connected to the clock terminal, and the other of the source electrode and the drain electrode connected to the output terminal, a drain electrode and a source electrode of the pixel control transistor are provided in the third metal layer, the gate electrode of the pixel control transistor is provided in the second metal layer, the scanning signal line is provided in the second metal layer in the display region, the substrate further includes a first additional line electrically connected to the gate electrode of the output control transistor, the first additional line includes a first additional line portion provided in the first metal layer in the display region, and the first additional line portion overlaps the scanning signal line in the display region via the first insulating layer.

(2) In an embodiment of the present invention, the image display device includes the structure (1) and the first additional line does not protrude from the scanning signal line in the display region in a plan view.

(3) In an embodiment of the present invention, the image display device includes the structure (1) or (2), the substrate further includes multiple video signal lines intersecting the scanning signal line, and the first additional line portion intersects at least one of the video signal lines.

(4) In an embodiment of the present invention, the image display device includes the structure (1), (2), or (3), the substrate further includes a second additional line that includes a second additional line portion provided in the first metal layer in the display region and is arranged with a gap portion provided between the first additional line and the second additional line, the second additional line is not electrically connected to the gate electrode of the output control transistor, and is arranged at a position farther from the gate driver than the first additional line is, and the second additional line portion overlaps the scanning signal line in the display region via the first insulating layer.

(5) In an embodiment of the present invention, the image display device includes the structure (4), the substrate further includes multiple video signal lines intersecting the scanning signal line, and the second additional line portion intersects at least one of the video signal lines.

(6) In an embodiment of the present invention, the image display device includes the structure (4) or (5) and the second additional line is not electrically connected to the scanning signal line.

(7) In an embodiment of the present invention, the image display device includes the structure (4) or (5), and the second additional line is electrically connected to the scanning signal line.

(8) In an embodiment of the present invention, the image display device includes the structure (4), (5), (6), or (7), and the gap portion is provided at a position not overlapping the pixel control transistor.

(9) In an embodiment of the present invention, the image display device includes the structure (1), (2), (3), (4), (5), (6), (7) or (8), the substrate further includes a conductive member including a capacitor forming portion that overlaps the pixel electrode in the display region to form an auxiliary capacitor, and a main line provided in the frame region and electrically connected to the conductive member, and the scanning signal line intersects the main line in the frame region.

(10) In an embodiment of the present invention, the image display device includes the structure (9), and the main line has a neck portion in a region intersecting the scanning signal line.

(11) In an embodiment of the present invention, the image display device includes the structure (9) or (10), and the main line has a multilayer structure including at least a conductive line portion provided in the first metal layer.

(12) In an embodiment of the present invention, the image display device includes the structure (1), (2), (3), (4), (5), (6), (7), (8), (9), (10), or (11) and is a liquid crystal display device.

The present invention can provide an image display device capable of reducing a frame region and suppressing a reduction in the aperture ratio of the display region while providing at least a part of a gate driver monolithically in the frame region.

DETAILED DESCRIPTION OF THE INVENTION

Hereinafter, embodiments are shown, and the present invention will be described in more detail with reference to the drawings, but the present invention is not limited only to these embodiments. Further, the configurations of the embodiments may be appropriately combined or changed within the spirit of the present invention.

Embodiment 1

In the present embodiment, an image display device will be described by taking a liquid crystal display device as an example. More specifically, a liquid crystal display device of an FFS (Fringe Field Switching) mode, which is a kind of horizontal alignment mode in which liquid crystal molecules are aligned in a substantially horizontal direction with respect to the main surface of the substrate in the voltage non-applied state, will be described as an example.

Figure 1:
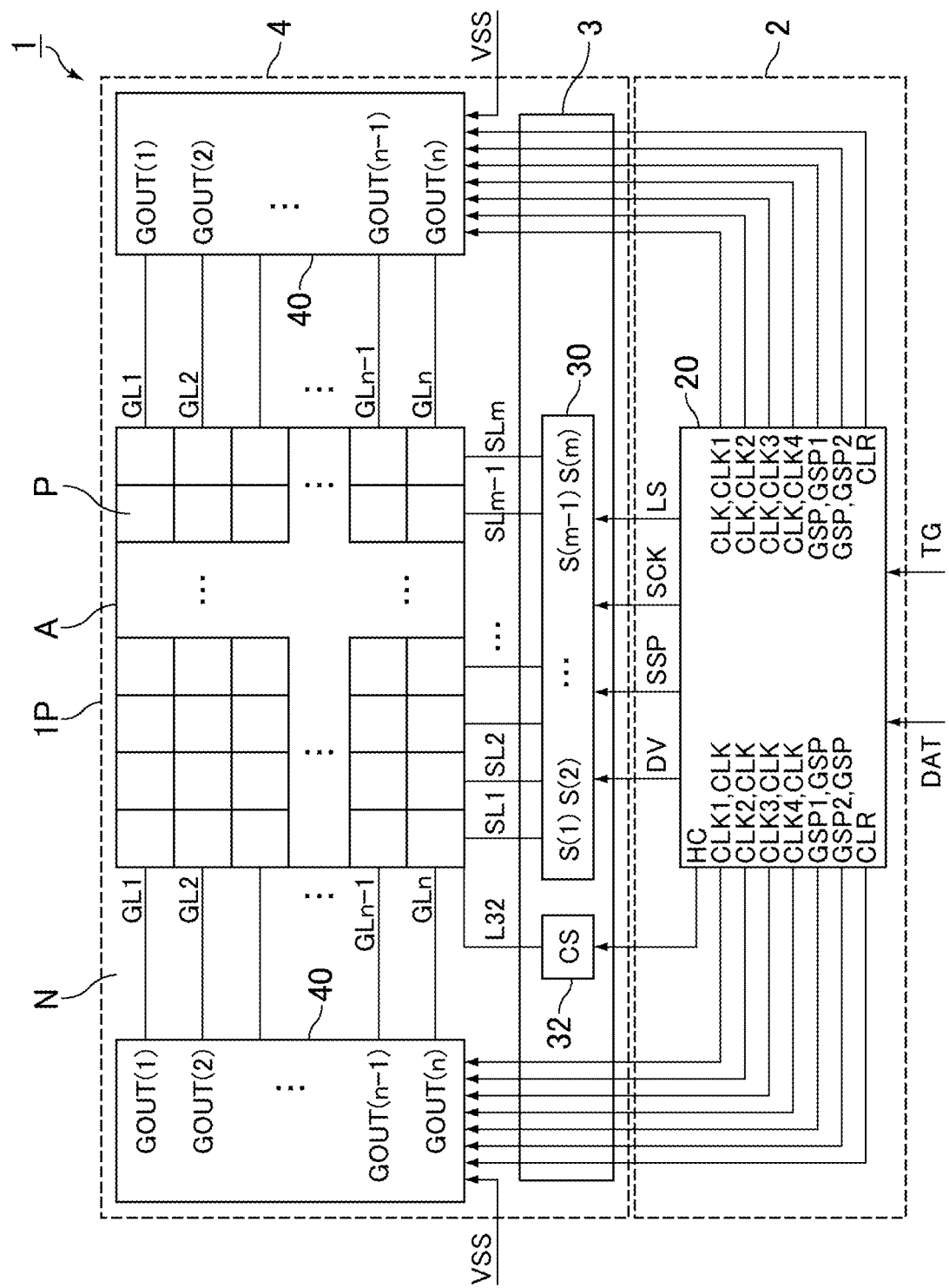
FIG. 1 is a block diagram showing an entire configuration of a liquid crystal display device of Embodiment 1.

FIG. 1 is a block diagram showing the entire configuration of the liquid crystal display device of Embodiment 1. As shown in FIG. 1, a liquid crystal display device 1 of Embodiment 1 includes a liquid crystal display panel 1P as a display panel, and a control substrate 2. The liquid crystal display panel 1P has a display region A in which an image is displayed and a frame region N which is a region outside the display region A. The control substrate 2 is provided with a display control circuit 20.

The liquid crystal display panel 1P includes an array substrate 4 as a substrate. In the frame region N of the liquid crystal display panel 1P, an IC chip 3 having a source driver (video signal line drive circuit) 30 and a common driver (common electrode drive circuit) 32 is mounted on the array substrate 4. Further, in the frame region N of the liquid crystal display panel 1P, a gate driver (scanning signal line drive circuit) 40 is directly formed on the array substrate 4. The gate driver 40 in the present embodiment is a monolithic gate driver.

One source driver 30 is arranged downward in the drawing of the display region A, and a total of two gate drivers 40 are arranged in the lateral direction in the drawing of the display region A (one in the left and one in the right of the drawing).

In the display region A, multiple (m, m is an integer of 2 or more) video signal lines (source bus lines) SL1 to SLm and multiple (n, n is an integer of 2 or more) scanning signal lines (gate bus lines) GL1 to GLn, and multiple (n×m) display units P provided in a matrix corresponding to the intersections of their video signal lines SL1 to SLm and the scanning signal lines GL1 to GLn, respectively are arranged. In the present specification, each of the video signal lines SL1 to SLm is also referred to as a video signal line SL. In addition, each of the scanning signal lines GL1 to GLn is also referred to as a scanning signal line GL. Further, "display unit" means a region corresponding to one pixel electrode, and may be one called "pixel" in the technical field of the liquid crystal display device, and in the case of dividing and driving one pixel, the divided pixels may be called "sub-pixels", "dots" or "picture elements".

The display control circuit 20 externally receives an image signal DAT and a timing signal group TG such as a horizontal synchronization signal and a vertical synchronization signal. The display control circuit 20 outputs, based on these signals, a digital video signal DV, a source start pulse signal SSP for controlling image display in the display region A, a source clock signal SCK, a latch strobe signal LS, a first gate start pulse signal GSP1, a second gate start pulse signal GSP2, a first gate clock signal CLK1, a second gate clock signal CLK2, a third gate clock signal CLK3, a fourth gate clock signal CLK4, an initialization signal CLR, and a common driver control signal HC for controlling an operation of a common driver 32. The common driver 32 outputs a common electrode drive signal CS based on the common driver control signal HC output from the display control circuit 20. The common electrode drive signal CS is applied to a common electrode (not shown in FIG. 1)

provided to cover the display region A via a main line (common main line) L32 provided to surround the display region A. In the present specification, each of the first to fourth gate clock signals CLK1 to CLK4 is also referred to as a "gate clock signal CLK", and the gate clock signal is also referred to as a "clock signal". The first and second gate start pulse signals GSP1 and GSP2 are also referred to as gate start pulse signals GSP, respectively.

Figure 2:
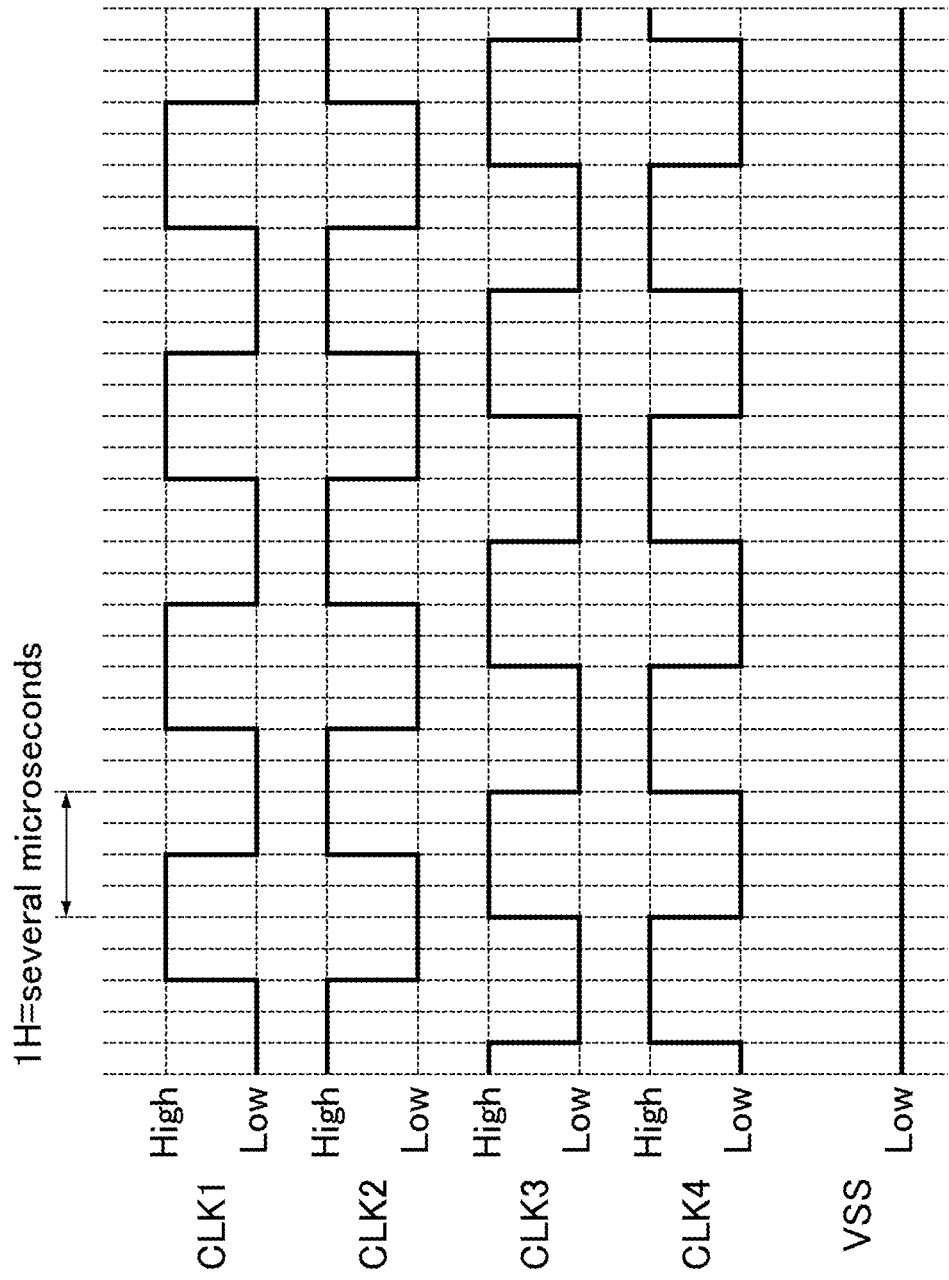
FIG. 2 is a timing chart for describing a gate clock signal.

Here, the gate clock signal will be described. FIG. 2 is a timing chart for describing the gate clock signal. The gate clock signal CLK is a signal in which a high potential state and a low potential state are periodically repeated. As shown in FIG. 2, each of the first to fourth gate clock signals CLK1 to CLK4 has the same length of one cycle, and is a signal in which a potential is inverted between a low potential (Low=the same potential as the power supply voltage VSS) and a high potential (High) every half cycle. The first and second gate clock signals CLK1 and CLK2 are signals that are out of phase by quarter cycle with the third and fourth gate clock signals CLK3 and CLK4, respectively. The cycle of each of the first to fourth gate clock signals CLK1 to CLK4 is, for example, several µ seconds to several tens of µ seconds.

The first and second gate clock signals CLK1 and CLK2 are paired signals, and the third and fourth gate clock signals CLK3 and CLK4 are paired signals. As will be described later, among the unit circuits constituting the shift register provided in the gate driver 40, the first and second gate clock signals CLK1 and CLK2 are supplied to the unit circuits of the odd-numbered stages, and the third and fourth gate clock signals CLK3 and CLK4 are not supplied. The third and fourth gate clock signals CLK3 and CLK4 are supplied to the unit circuits of the even-numbered stages, and the first and second gate clock signals CLK1 and CLK2 are not supplied.

As shown in FIG. 1, the source driver 30 receives the digital video signal DV, the source start pulse signal SSP, the source clock signal SCK, and the latch strobe signal LS from the display control circuit 20, and the source driver 30 applies, based on these signals, drive video signals S(1) to S(m) to the respective video signal lines SL1 to SLm. In the present specification, the drive video signals S(1) to S(m) are also referred to as drive video signals S, respectively.

Figure 3:
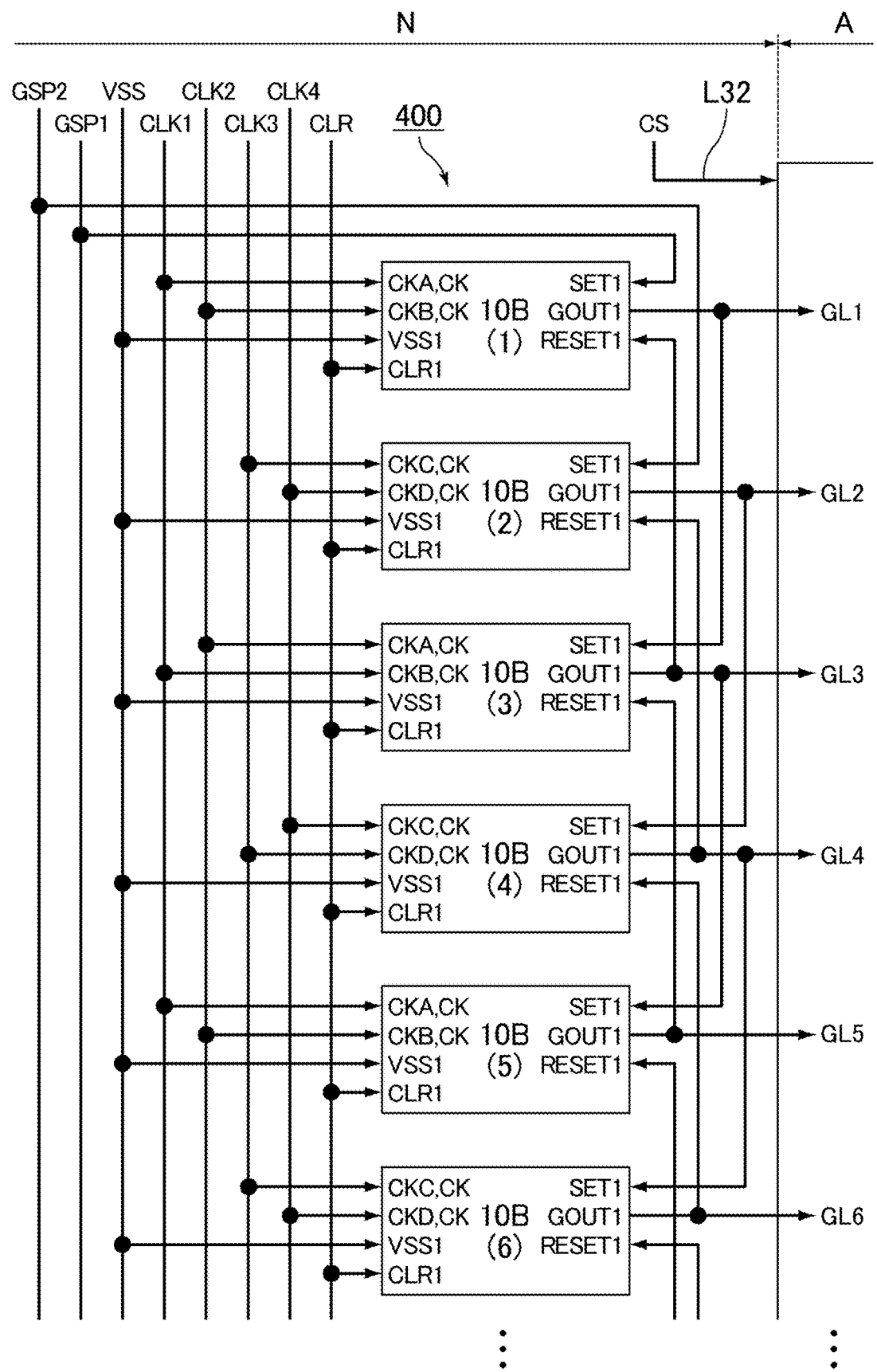
FIG. 3 is a detail of a block diagram showing a configuration of a gate driver.

Next, the configuration of the gate driver 40 in the present embodiment will be described. FIG. 3 is a detail of a block diagram showing the configuration of the gate driver. As shown in FIGS. 1 and 3, the gate driver 40 is constituted by n stages of shift registers 400. In the display region A, a pixel matrix (display unit P) of n rows×m columns is formed, and each stage of the shift register 400 is arranged to correspond to each row of the pixel matrix one to one. Further, each stage of the shift register 400 is a unit circuit (bistable circuit) that becomes one of two states (a first state and a second state) at each time point and outputs a signal (state signal) indicating the state as a scanning signal. Thus, the shift register 400 is constituted by n unit circuits 10B(1) to 10B(n). In the present embodiment, when a unit circuit is in the first state, a high level (on level) potential state signal is output from the unit circuit, and when the unit circuit is in the second state, a low level (off level) potential state signal is output from the unit circuit. In the present specification, each of the unit circuits 10B(1) to 10B(n) is also referred to as 10B.

Among the unit circuits 10B, clock terminals CKA and CKB for receiving two-phase clock signals (the first gate clock signal CLK1 and the second gate clock signal CLK2) are provided in the unit circuits 10B of the odd-numbered stages, and clock terminals CKC and CKD for receiving two-phase clock signals (the third gate clock signal CLK3 and the fourth gate clock signal CLK4) are provided in the unit circuits 10B of the even-numbered stages. The clock terminals CKA, CKB, CKC, and CKD are also referred to as clock terminals CK.

In the unit circuits (10B(1), 10B(3), 10B(5), and so forth) of the odd-numbered stages, the gate clock signals (the first gate clock signal CLK1 and the second gate clock signal CLK2) input to the clock terminals CKA and CKB are switched between odd-numbered unit circuits (10B(1), 10B (5), and so forth) and even-numbered unit circuits (10B(3) and so forth). Specifically, the first gate clock signal CLK1 is input to the clock terminal CKA of the odd-numbered unit circuit among the unit circuits of the odd-numbered stages, and the second gate clock signal CLK2 is input to the clock terminal CKB. The second gate clock signal CLK2 is input to the clock terminal CKA of the even-numbered unit circuit among the unit circuits of the even-numbered stages, and the first gate clock signal CLK1 is input to the clock terminal CKB.

Each unit circuit 10B is provided with a power supply terminal VSS1 for receiving a low-level (low-potential) power supply voltage VSS, a clear terminal CLR1 for receiving an initialization signal CLR, an input terminal SET1 for receiving a set signal, an input terminal RESET1 for receiving a reset signal, and an output terminal GOUT1 for outputting a scanning signal.

When a first gate start pulse signal GSP1 (also referred to as a start signal) as a set signal, a first gate clock signal CLK1, a second gate clock signal CLK2, an initialization signal CLR, and a power supply voltage VSS supplied from a predetermined power supply circuit (not shown) are input to the unit circuit 10B(1) of the first stage of the shift register 400, an active scanning signal GOUT(1) is output from the unit circuit 10B(1) to the scanning signal line GL1 based on these signals and the voltage. The scanning signal GOUT(1) output from the unit circuit 10B(1) is applied to the corresponding scanning signal line GL1, and applied as a set signal to the unit circuit 10B(3) of a stage two stages after, that is, the third stage. When the set signal, the first gate clock signal CLK1, the second gate clock signal CLK2, the initialization signal CLR, and the power supply voltage VSS are input to the unit circuit 10B(3) of the third stage, an active scanning signal GOUT(3) is output from the unit circuit 10B(3) to the scanning signal line GL3 based on these signals and the voltage. The scanning signal GOUT(3) output from the unit circuit 10B(3) is applied to the corresponding scanning signal line GL3, and applied, as a set signal, to the unit circuit 10B(5) of a stage two stages after, that is, the fifth stage, and also applied, as a reset signal, to the unit circuit 10B(1) of a stage two stages before, that is, the first stage. The scanning signal GOUT is output from the unit circuit 10B of the odd-numbered stage after the fifth stage to the corresponding scanning signal line GL, in the same manner as in the unit circuit 10B(3) of the third stage. In this manner, the active scanning signals GOUT (1), GOUT (3), GOUT (5), and so forth are sequentially output from the corresponding unit circuits 10B(1), 10B(3), 10B (5), and so forth of the odd-numbered stages to the scanning signal lines GL1, GL3, GL5, and so forth of the odd-numbered stages.

In addition, when the second gate start pulse signal GSP2 (also referred to as a start signal) as a set signal, the third gate clock signal CLK3, the fourth gate clock signal CLK4, the initialization signal CLR, and the power supply voltage VSS are input to the unit circuit 10B(2) of the second stage of the shift register 400, an active scanning signal GOUT(2) is output from the unit circuit 10B(2) to the scanning signal line GL2 based on these signals and the voltage. The scanning signal GOUT(2) output from the unit circuit 10B (2) is applied to the corresponding scanning signal line GL2, and also applied, as a set signal, to the unit circuit 10B(4) of a stage two stages after, that is, the fourth stage. When the set signal, the third gate clock signal CLK3, the fourth gate clock signal CLK4, the initialization signal CLR, and the power supply voltage VSS are input to the unit circuit 10B(4) of the fourth stage, an active scanning signal GOUT (4) is output from the unit circuit 10B(4) to the scanning signal line GL4 based on these signals and the voltage. The scanning signal GOUT(4) output from the unit circuit 10B (4) is applied to the corresponding scanning signal line GL4, and also applied, as a set signal, to the unit circuit 10B(6) of a stage two stages after, that is, the sixth stage, and also applied, as a reset signal, to the unit circuit 10B(2) of a stage two stages before, that is, the second stage. The scanning signal GOUT is output from the unit circuit 10B of the even-numbered stage after the sixth stage to the corresponding scanning signal line GL, in the same manner as in the unit circuit 10B(3) of the fourth stage. In this manner, the active scanning signals GOUT(2), GOUT(4), GOUT(6), and so forth are sequentially output from the corresponding unit circuits 10B(2), 10B(4), 10B(6), and so forth of the even-numbered stages to the scanning signal lines GL2, GL4, GL6, and so forth of the even-numbered stages.

Thus, it can be said that the gate driver 40 of the present embodiment is two shift registers combined so that the cycles are shifted. The gate driver 40 repeats the application of the scanning signals GOUT(1) to GOUT(n) with one vertical scanning period as one cycle. In the present specification, the scanning signals GOUT(1) to GOUT(n) are also referred to as scanning signals GOUT, respectively.

Here, the signals output from the display control circuit 20 to the two gate drivers 40 are the same. Further, the scanning signals GOUT are simultaneously input to the respective scanning signal lines GL from the two gate drivers 40 located at both ends of the scanning signal line GL. Note that the potential of the power supply voltage VSS corresponds to the potential of the scanning signal when the scanning signal line GL is in a non-selected state. Further, the initialization signal CLR and the power supply voltage VSS are the signals commonly used in the unit circuits (10B(1), 10B(3), 10B(5), and so forth) of the odd-numbered stages and the unit circuits (10B(2), 10B(4), 10B(6), and so forth) of the even-numbered stages.

As described above, the drive video signals S(1) to S(m) corresponding to the respective video signal lines SL1 to SLm are applied, and the scanning signals GOUT(1) to GOUT(n) corresponding to the respective scanning signal lines GL1 to GLn are applied.

Figure 4:
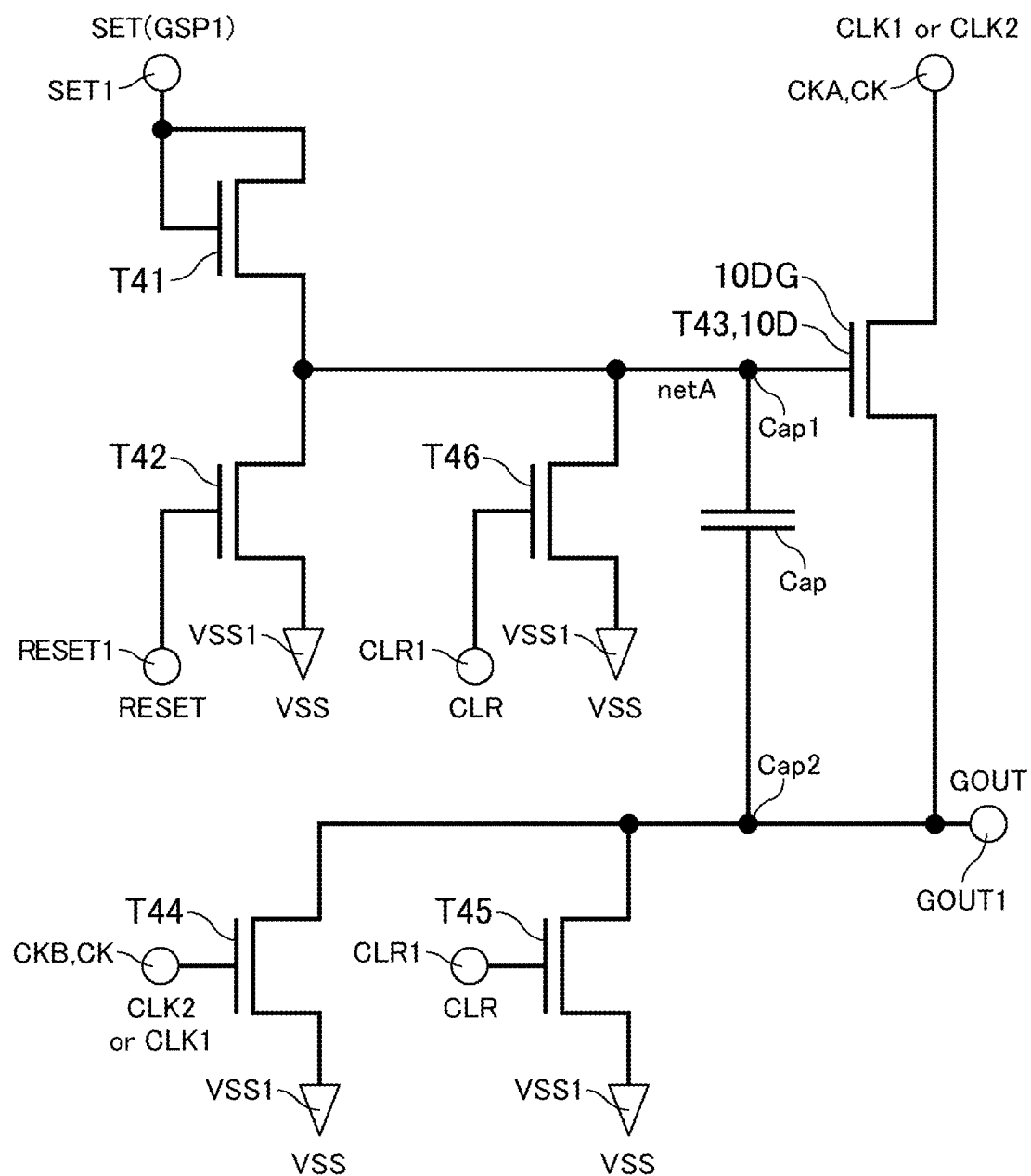
FIG. 4 is a circuit diagram showing a configuration of a unit circuit of an odd-numbered stage.

Next, the configuration of unit circuit 10B will be described in detail. FIG. 4 is a circuit diagram showing a configuration of a unit circuit of the odd-numbered stage. Each unit circuit 10B of the odd-numbered stage has six TFTs (thin-film transistors T41, T42, T43, T44, T45, and T46) and a bootstrap capacitor Cap. Each unit circuit 10B has a power supply terminal VSS1 for receiving a low-level power supply voltage VSS, five input terminals (an input terminal SET1 to which a set signal SET is input, an input terminal RESET1 to which a reset signal RESET is input), a clock terminal CKA, a clock terminal CKB, and a clear terminal CLR1), and one output terminal (output node) GOUT1. The drain terminal of the thin-film transistor T41, the drain terminal of the thin-film transistor T42, and the gate terminal of the thin-film transistor T43 are connected to one another. A region in which these terminals are connected to one another is also referred to as a "netA".

The gate terminal and the source terminal of the thin-film transistor T41 are connected to the input terminal SET1. That is, the gate terminal and the source terminal are diode-connected. The drain terminal of the thin-film transistor T41 is connected to the netA.

The gate terminal of the thin-film transistor T42 is connected to the input terminal RESET1, the drain terminal is connected to the netA, and the source terminal is connected to the power supply terminal VSS1.

The gate terminal of the thin-film transistor T43 is connected to the netA, the source terminal is connected to the clock terminal CKA, and the drain terminal is connected to the output terminal GOUT1. The thin-film transistor T43 is an output control TFT 10D that functions as an output control transistor in each unit circuit 10B. The output control transistor is a transistor in which one of the conduction terminals (the drain terminal in the present embodiment) is connected to the output terminal in the unit circuit 10B, and controls the potential of the scanning signal GOUT by changing the potential of the control terminal of the transistor (the gate terminal in the present embodiment).

The gate terminal of the thin-film transistor T44 is connected to the clock terminal CKB, the drain terminal is connected to the output terminal GOUT1, and the source terminal is connected to the power supply terminal VSS1.

The gate terminal of the thin-film transistor T45 is connected to the clear terminal CLR1, the drain terminal is connected to the output terminal GOUT1, and the source terminal is connected to the power supply terminal VSS1.

The gate terminal of the thin-film transistor T46 is connected to the clear terminal CLR1, the drain terminal is connected to the netA, and the source terminal is connected to the power supply terminal VSS1. The thin-film transistor T46 can initialize the netA.

One terminal Cap1 of the bootstrap capacitor Cap is connected to the netA (the gate electrode 10DG of the output control TFT 10D (thin-film transistor T43)), and the other terminal Cap2 is connected to the output terminal GOUT1. The bootstrap capacitor Cap is formed between the netA and the output terminal GOUT1, that is, between the gate and the source of the thin-film transistor T43. The bootstrap capacitor Cap raises the potential of the netA together with the rise of the potential of the output terminal GOUT1. By thus providing the bootstrap capacitor Cap, in the liquid crystal display device 1 of the present embodiment, a potential higher than the power supply potential (power supply voltage) can be generated, and the output control TFT 10D (thin-film transistor T43) can be changed from the off state to the on state in a short time so as to reduce the output loss as much as possible.

Although FIG. 4 shows the configuration of the unit circuit 10B of the odd-numbered stage, as the unit circuit 10B of the even-numbered stage, the unit circuit in which the first gate clock signal CLK1 in FIG. 4 is changed to the third gate clock signal CLK3, the second gate clock signal CLK2 to the fourth gate clock signal CLK4, the clock terminal CKA to the clock terminal CKC, the clock terminal CKB to the clock terminal CKD, and the first gate start pulse signal GSP1 to the second gate start pulse signal GSP2 can also be used.

Figure 5A:
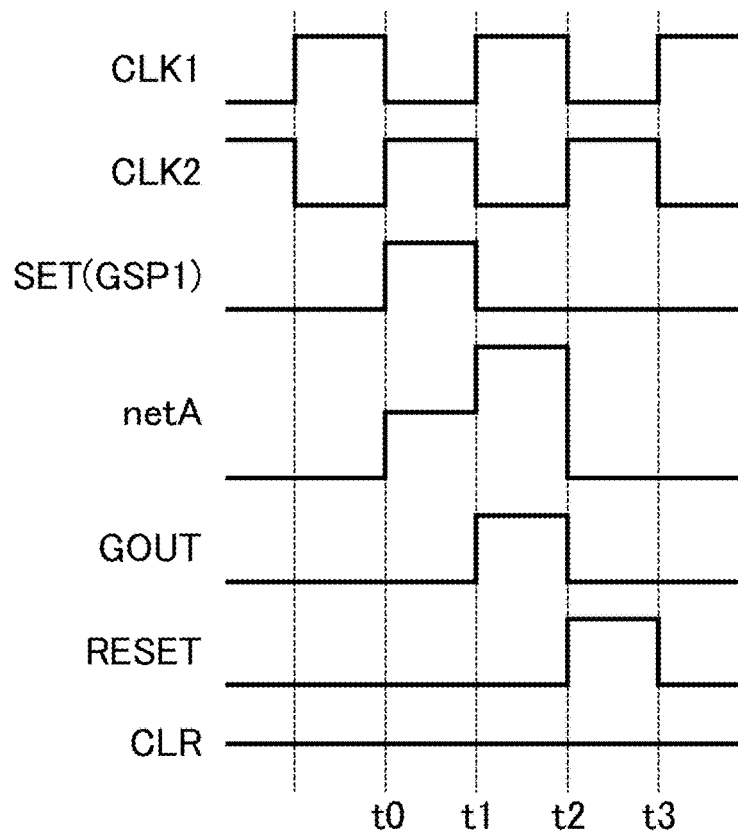
FIG. 5A is a diagram for describing an operation of a shift register, and is a timing chart regarding a unit circuit of an odd-numbered stage.
Figure 5B:
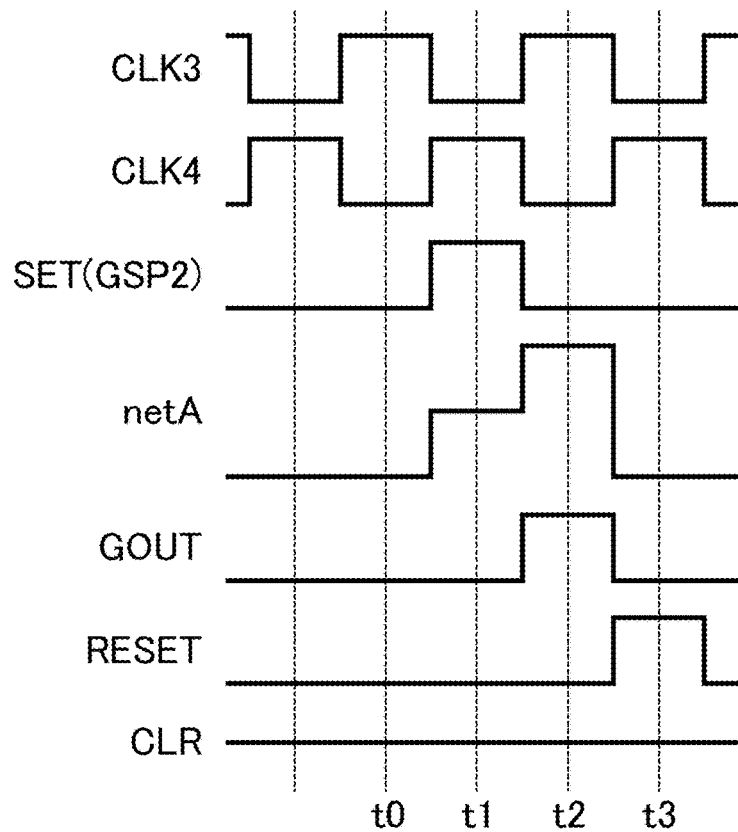
FIG. 5B is a diagram for describing an operation of a shift register, and is a timing chart regarding a unit circuit of an even-numbered stage.

FIG. 5A is a diagram for describing the operation of the shift register, and is a timing chart regarding the unit circuit of the odd-numbered stage. FIG. 5B is a diagram for describing the operation of the shift register, and is a timing chart regarding the unit circuit of the even-numbered stage.

The operation of each unit circuit 10B in the odd-numbered stage will be described using FIG. 5A. To the clock terminal CKA, the first gate clock signal CLK1 which becomes high-level every one horizontal scanning period is input. To the clock terminal CKB, the second gate clock signal CLK2 that is 180 degrees out of phase with the first gate clock signal CLK1 is input. In the period before a time point t0, the potential of the netA and the potential of the scanning signal GOUT (output terminal GOUT1) are at the low level.

At the time point t0, the set signal SET (in the case of the unit circuit of the first stage, the first gate start pulse signal GSP1 as the set signal SET) is applied to the input terminal SET1. Here, the time point t0 is the timing at which the scanning signal line GL connected two stages before is in the selected state (the timing at which the first gate start pulse signal GSP1 is input when the unit circuit 10B being focused is the unit circuit 10B(1) of the first stage).

Since the thin-film transistor T41 is diode-connected, the thin-film transistor T41 is turned on by the set signal SET, and the bootstrap capacitor Cap is charged. As a result, the potential of the netA changes from the low-level to the high-level, and the thin-film transistor T43 is turned on. Here, during the period from time points t0 to t1, since the first gate clock signal CLK1 is at a low-level, the scanning signal GOUT is maintained at the low-level during this period. Further, during this period, since the reset signal RESET is at the low-level, the thin-film transistor T42 is maintained in the off-state. Therefore, the potential of the netA does not decrease during the period from the time points t0 to t1.

At the time point t1, the first gate clock signal CLK1 changes from the low-level to the high-level. At this time, since the thin-film transistor T43 is in the on-state, the potential of the output terminal GOUT1 rises together with the rise of the potential of the clock terminal CKA. Here, since the bootstrap capacitor Cap is formed between the netA and the output terminal GOUT1, the potential of the netA also rises together with the rise of the potential of the output terminal GOUT1 (the netA is bootstrapped). As a result, a large voltage is applied to the gate terminal of the thin-film transistor T43, and the potential of the scanning signal GOUT rises to the high-level potential of the first gate clock signal CLK1. Thus, the scanning signal line GL connected to the output terminal GOUT1 of the unit circuit 10B is in the selected state.

Since the second gate clock signal CLK2 and the initialization signal CLR are at the low-level during the period from time points t1 to t2, the thin-film transistors T44 and T45 are maintained in the off-state, and during the period from the time points t1 to t2, the potential of the scanning signal GOUT never falls.

At the time point t2, the first gate clock signal CLK1 changes from the high-level to the low-level, whereby the potential of the output terminal GOUT1 decreases together with the decrease of the potential of the clock terminal CKA, and the potential of the netA also decreases via the bootstrap capacitor Cap. At the time point t2, a pulse of the reset signal RESET is applied to the input terminal RESET1, and the thin-film transistor T42 is turned on. As a result, the potential of the netA changes from the high-level to the low-level. At the time point t2, the second gate clock signal CLK2 changes from the low-level to the high-level. Thus, the thin-film transistor T44 is turned on, and as a result, the potential of the output terminal GOUT1, that is, the potential of the scanning signal GOUT becomes low-level.

The scanning signal GOUT output from each unit circuit 10B of the odd-numbered stage is input to the input terminal SET1 of the unit circuit after two stages as the set signal SET, and is also input to the input terminal RESET1 of the unit circuit of a stage two stages before as the reset signal RESET. As a result, the scanning signal lines GL provided in the display region A are in the selected state by skipping one stage such as GL1, GL3, GL5, GL7, and so on.

As shown in FIG. 5B, the unit circuit 10B of the even-numbered stage is the same as the unit circuit 10B of the odd-numbered stage except that the first gate clock signal CLK1 is changed to the third gate clock signal CLK3, the second gate clock signal CLK2 is changed to the fourth gate clock signal CLK4, and the first gate start pulse signal GSP1 is changed to the second gate start pulse signal GSP2. Also in the even-numbered stages, in the same manner as in the odd-numbered stages, the scanning signal lines GL provided in the display region A are in the selected state by skipping one stage such as GL2, GL4, GL6, GL8, and so on.

As described above, each of the scanning signal lines GL1, GL3, GL5, GL7, and so forth of the odd-numbered stages and the scanning signal lines GL2, GL4, GL6, GL8, and so forth of the even-numbered stages are in the selected state by skipping one stage, and thus the scanning signal lines GL1, GL2, GL3, GL4, GL5, GL6, GL7, GL8, and so forth are sequentially selected.

Figure 6:
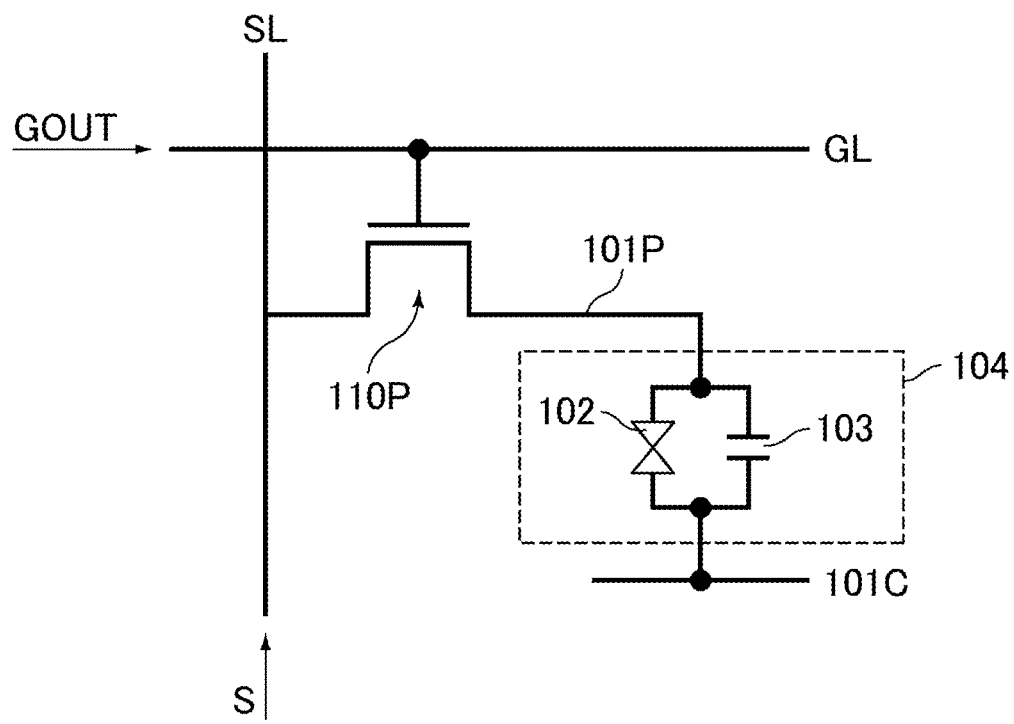
FIG. 6 is a circuit diagram showing a configuration of a display unit included in the liquid crystal display device of Embodiment 1.

FIG. 6 is a circuit diagram showing a configuration of a display unit included in the liquid crystal display device of Embodiment 1. As shown in FIG. 6, each display unit P includes a pixel control TFT 110P as a pixel control transistor in which the gate electrode is connected to the scanning signal line GL passing the corresponding intersection and the source electrode is connected to the video signal line SL passing the intersection, a pixel electrode 101P connected to the drain electrode of the pixel control TFT 110P, a common electrode 101C commonly provided to the display units P, a liquid crystal capacitor 102 formed between the pixel electrode 101P and the common electrode 101C with a liquid crystal layer 6 as a dielectric, and an auxiliary capacitor 103 formed between the pixel electrode 101P and the common electrode 101C with a fourth insulating layer (not shown in FIG. 6) described later as a dielectric. Also, a pixel capacitor 104 is formed by the liquid crystal capacitor 102 and the auxiliary capacitor 103. Then, when the gate electrode of each pixel control TFT 110P receives an active scanning signal GOUT from the gate bus line GL, based on the drive video signal S that the source electrode of the pixel control TFT 110P receives from the source bus line SL, the pixel capacitor 104 holds a voltage indicating a pixel value. In this manner, an image based on the image signal DAT input from the outside is displayed in the display region A.

Figure 7:
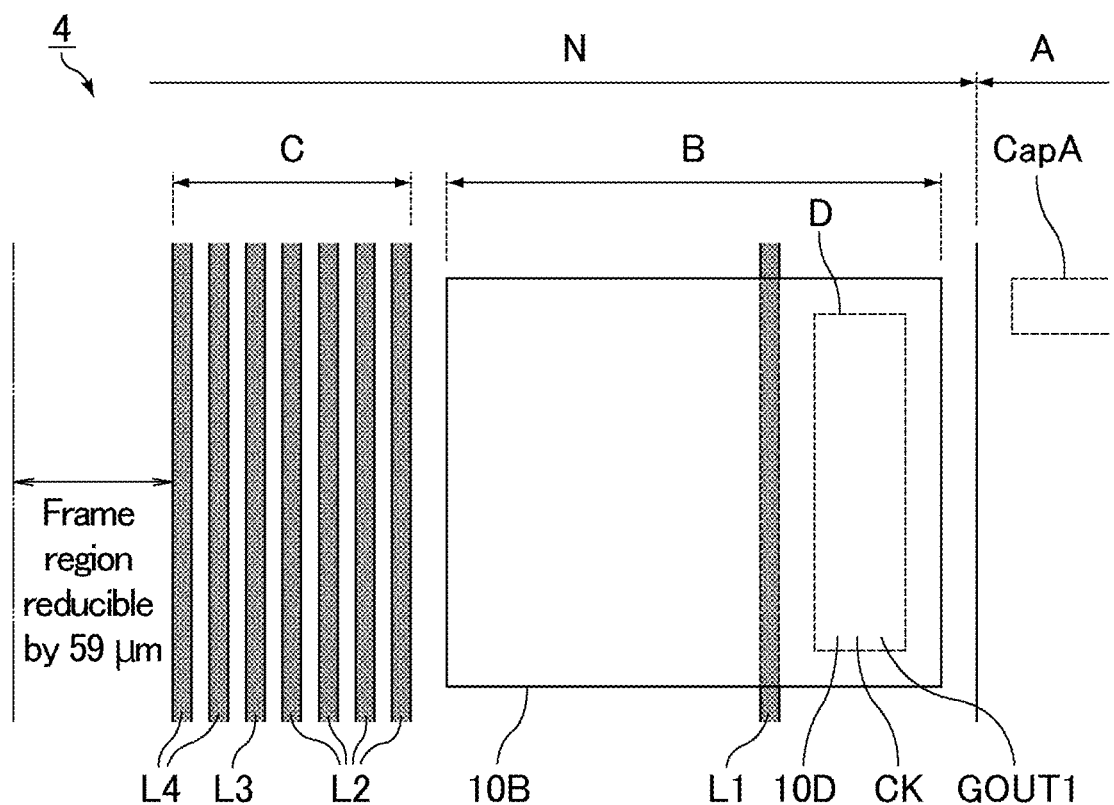
FIG. 7 is a schematic plan view showing a periphery of a unit circuit provided in a gate driver of the liquid crystal display device of Embodiment 1.
Figure 8A:
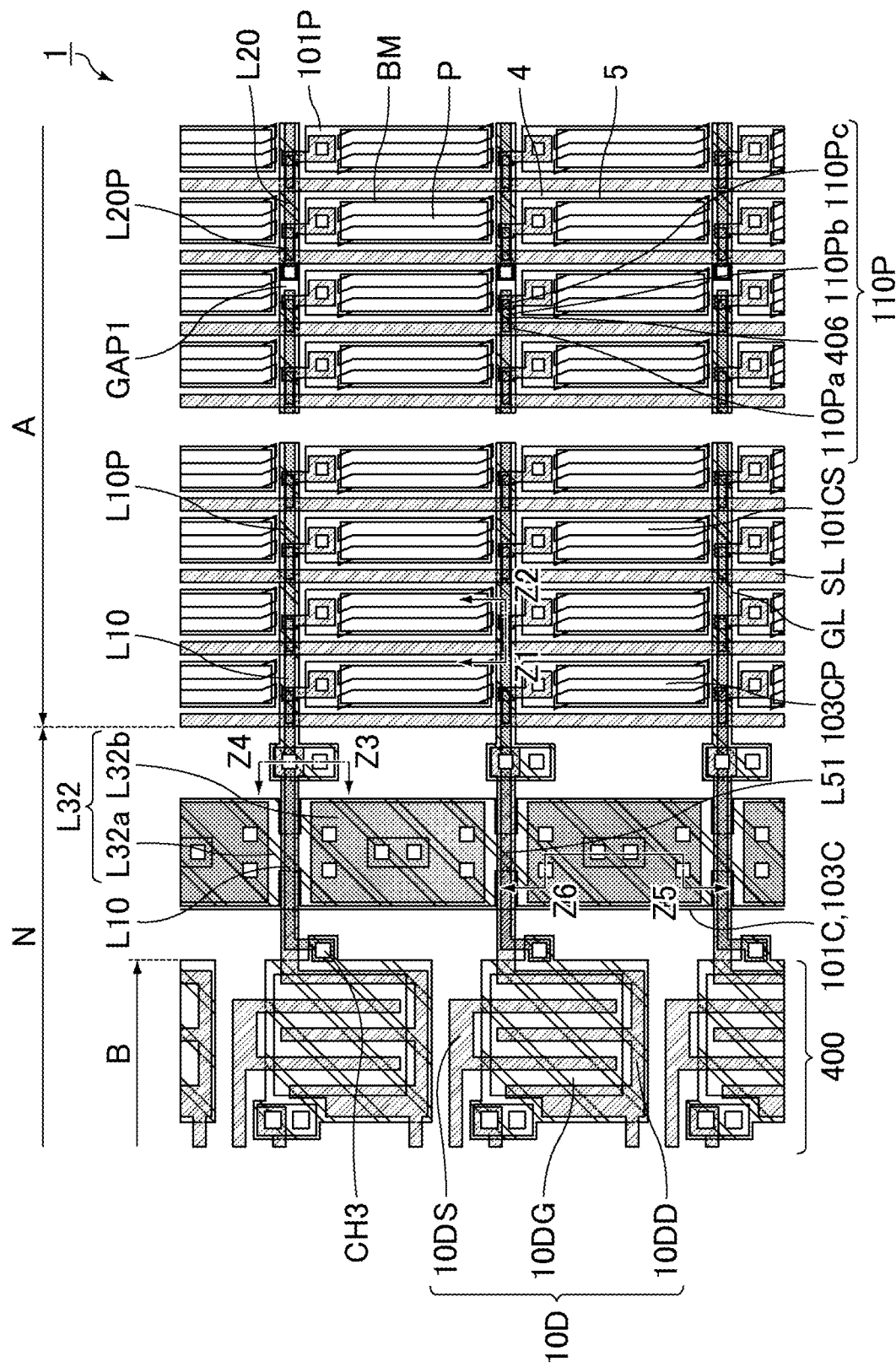
FIG. 8A is a schematic plan view of the liquid crystal display device of Embodiment 1.
Figure 8B:
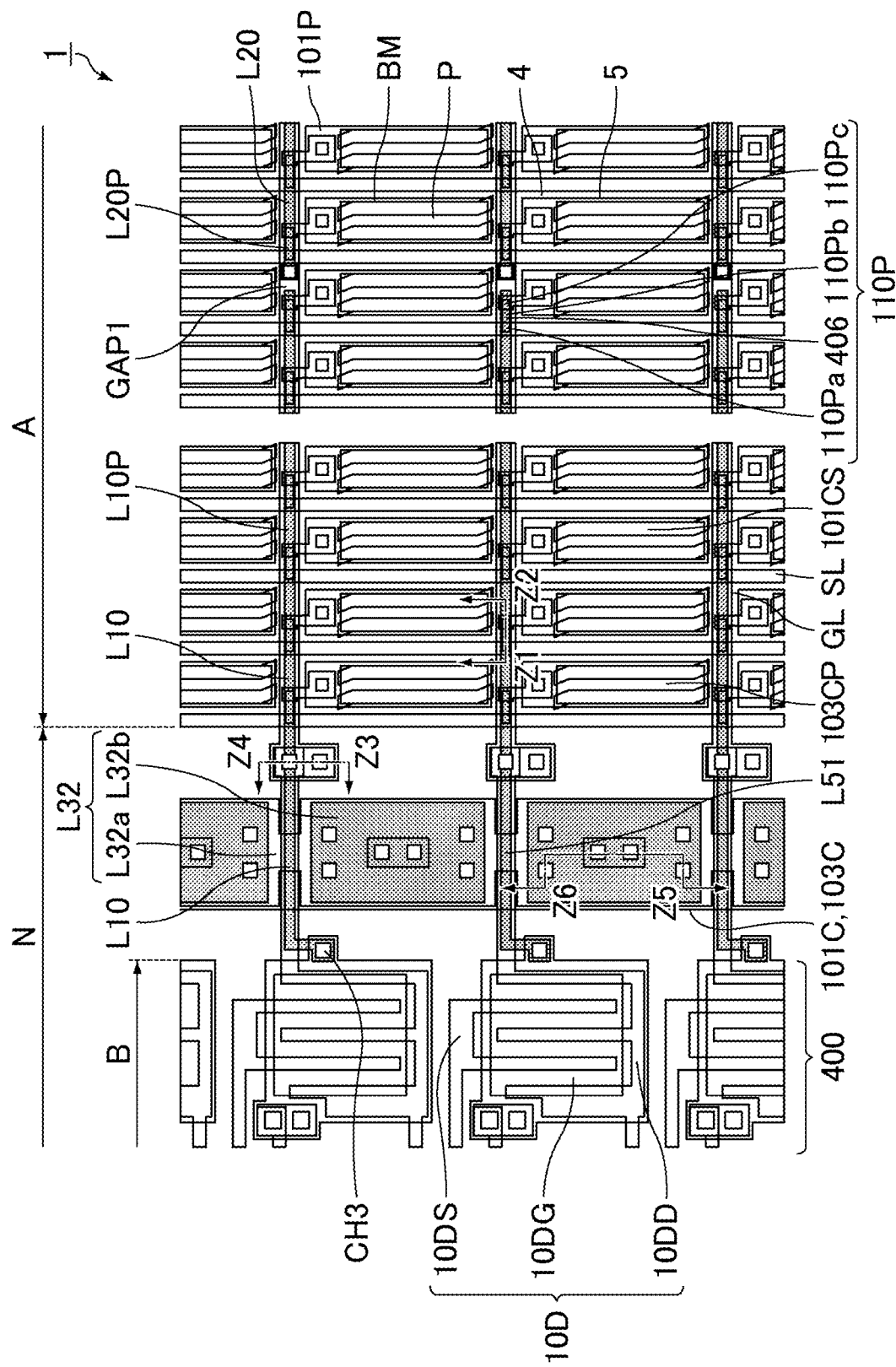
FIG. 8B is a schematic plan view emphasizing a first metal layer provided in the liquid crystal display device of Embodiment 1.

FIG. 7 is a schematic plan view showing a periphery of the unit circuit provided in the gate driver of the liquid crystal display device of Embodiment 1. FIG. 8A is a schematic plan view of the liquid crystal display device of Embodiment 1, and FIG. 8B is a schematic plan view emphasizing the first metal layer provided in the liquid crystal display device of Embodiment 1. FIGS. 8A and 8B show a region on the display region side with respect to the initialization line shown in FIG. 7. Blank portions between display units in FIGS. 8A and 8B indicate that the illustration of the display region is omitted. FIGS. 8A and 8B focus on the gate driver 40 located on the left side of the drawing of FIG. 1, and the gate driver 40 located on the right side of the drawing of FIG. 1 has a configuration in which the gate driver 40 located on the left side is laterally inverted.

In the liquid crystal display device 1 of the present embodiment, multiple scanning signal lines GL are arranged at intervals of, for example, approximately 60 µm, multiple video signal lines SL are arranged at intervals of, for example, approximately 20 µm, the liquid crystal display device 1 has a corresponding GDM configuration of vertical stripe pixels, and for example, an FFS mode liquid crystal display device of 10.7 type 4K is cited as an example of the liquid crystal display device 1 of the present embodiment.

The scanning signal lines GL and the video signal lines SL are arranged in the display region A on the array substrate 4 provided in the liquid crystal display device 1 of the present embodiment. In the frame region N, a drive circuit region B, which is a region in which the shift register 400 is arranged, and a drive signal main line region C, which is a region in which a line for inputting a drive signal to the shift register 400 is arranged. Multiple unit circuits 10B constituting one initialization line L1 and the shift register 400 are arranged in the drive circuit region B, and four clock lines L2, one low potential line L3, and two start signal lines L4 are arranged in the drive signal main line region C. The first to fourth gate clock signals CLK1 to CLK4 are separately input to the four clock lines L2, respectively. Between the drive circuit region B and the display region A, a main line L32 for applying to the common electrode 101C the common electrode drive signal CS output from the common driver 32 is arranged.

Each of the unit circuits 10B included in the shift register 400 includes clock terminals CK to which clock signals (the first and second gate clock signals CLK1 and CLK2 for the unit circuit 10B of the odd-numbered stage and the third and fourth gate clock signals CLK3 and CLK4 for the unit circuit 10B of the even-numbered stage) are input, an output terminal GOUT1 that is electrically connected to the corresponding scanning signal line GL among the scanning signal lines GL and outputs the scanning signal GOUT to the corresponding scanning signal line GL, and an output control TFT 10D as an output control transistor with one of the source electrode and the drain electrode connected to the clock terminal CK and the other of the source electrode and the drain electrode connected to the output terminal GOUT1. The output control TFT 10D is a three-terminal switch including a source electrode 10DS, a drain electrode 10DD, and a gate electrode 10DG. The region where the output control TFT 10D is provided is referred to as an output control transistor region D.

A black matrix BM covering, for example, the scanning signal line GL, the video signal line SL, and the pixel control TFT 110P is provided on a color filter substrate 5 included in the liquid crystal display device 1, and the black matrix BM is provided with a rectangular opening in each display unit P. The black matrix BM is also provided in the frame region N and shields the frame region N from light.

Figure 9:
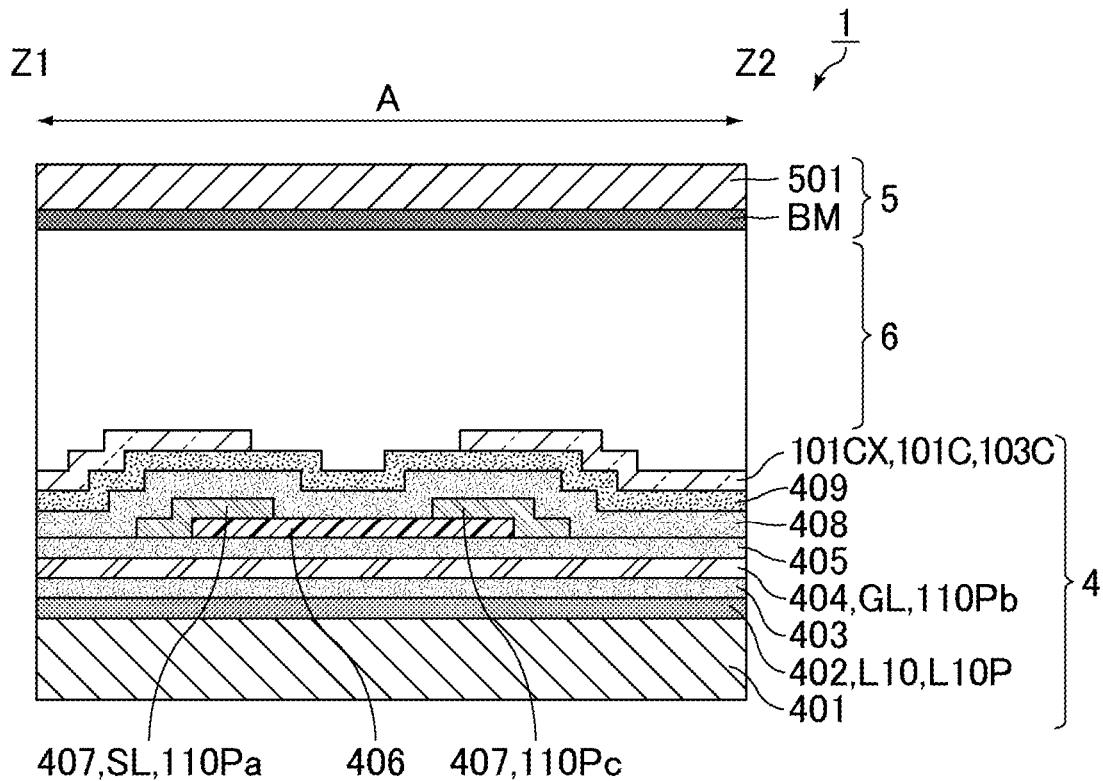
FIG. 9 is a schematic cross-sectional view showing a periphery of a pixel control TFT provided in the liquid crystal display device of Embodiment 1.

Here, the layer configuration of the liquid crystal display device will be described. FIG. 9 is a schematic cross-sectional view showing a periphery of the pixel control TFT provided in the liquid crystal display device of Embodiment 1. FIG. 9 is a schematic cross-sectional view taken along line Z1-Z2 in FIGS. 8A and 8B. The liquid crystal display device 1 of the present embodiment has an array substrate 4, a color filter substrate 5, and a liquid crystal layer 6 sandwiched between the array substrate 4 and the color filter substrate 5. The liquid crystal display device 1 includes a first alignment film (not shown) and a second alignment film (not shown) between the array substrate 4 and the liquid crystal layer 6 and between the color filter substrate 5 and the liquid crystal layer 6, respectively. The liquid crystal display device 1 includes a first polarizing plate (not shown) and a second polarizing plate (not shown) on the surface of the array substrate 4 opposite to the liquid crystal layer 6 and on the surface of the color filter substrate 5 opposite to the liquid crystal layer 6, respectively, and includes a backlight (not shown) on the surface of the first polarizing plate opposite to the liquid crystal layer 6. The first polarizing plate and the second polarizing plate have an arrangement relationship of crossed Nicols in which the polarization axes are orthogonal to each other.

The array substrate 4 sequentially includes an insulating substrate 401, a first metal layer 402, a first insulating layer 403, a second metal layer 404, a second insulating layer 405, a thin film semiconductor layer 406, a third metal layer 407, a third insulating layer 408, a first transparent conductive layer, a fourth insulating layer 409, and a second transparent conductive layer 101CX. The second insulating layer 405 is also referred to as a gate insulating layer. The pixel electrode 101P is arranged in the first transparent conductive layer, and the common electrode 101C is arranged in the second transparent conductive layer 101CX. In addition, as shown in FIGS. 8A, 8B and 9, the common electrode 101C also functions as a conductive member 103C including a capacitor forming portion 103CP that overlaps the pixel electrode 101P in the display region A to form the auxiliary capacitor 103.

The first insulating layer 403, the second insulating layer 405, the third insulating layer 408, and the fourth insulating layer 409 are, for example, inorganic insulating films. Examples of the material of the inorganic insulating film include silicon nitride ($SiN_x$) and silicon oxide ($SiO_2$). In the present embodiment, for example, as the first insulating layer 403, an $SiN_x$ layer can be used, and as the second insulating layer 405, an inorganic insulating film in which an $SiN_x$ layer and an $SiO_2$ layer are stacked in this order from the insulating substrate 401 side can be used. In addition, as the third insulating layer 408, an inorganic insulating film in which an $SiO_2$ layer and an $SiN_x$ layer are stacked in this order from the insulating substrate 401 side can be used, and as the fourth insulating layer 409, an $SiN_x$ layer can be used.

The first metal layer 402, the second metal layer 404, and the third metal layer 407 can be obtained by depositing, for example, a metal such as copper, titanium, aluminum, molybdenum, tungsten, or an alloy thereof in a single layer or multiple layers by a sputtering method or the like. The various conductive lines and electrodes formed on these layers can be obtained by performing patterning by a photolithography method or the like after film deposition. In the present embodiment, a metal film in which a copper layer and a titanium layer are stacked in this order from the insulating substrate 401 side can be used as the second metal layer 404 and the third metal layer 407. A metal film in which a titanium layer and a copper layer are stacked in this order from the insulating substrate 401 side can be used as the first metal layer 402. For the thin film semiconductor layer 406, an oxide semiconductor can be used. For example, an InGaZnO oxide semiconductor is used for the thin film semiconductor layer 406.

The pixel electrode 101P and the common electrode 101C can be formed, for example, by depositing and forming a transparent conductive material such as indium tin oxide (ITO), indium zinc oxide (IZO), zinc oxide (ZnO), tin oxide (SnO), or an alloy thereof in a single layer or multiple layers by a sputtering method or the like, and then performing patterning by using a photolithography method.

The pixel electrode 101P is an electrode provided for each display unit P, charges the drive video signal S to the pixel electrode 101P by the potential control of on/off of the scanning signal line GL, and can arbitrarily control the pixel potential. Thereby, a fringe electric field is generated between the pixel electrode 101P and the common electrode 101C, which is arranged on the upper layer of the pixel electrode 101P via the fourth insulating layer 409 and provided with a slit 101CS, thus rotating the liquid crystal molecules contained in the liquid crystal layer 6.

In this manner, the magnitude of the voltage applied between the pixel electrode 101P and the common electrode 101C is controlled, the retardation of the liquid crystal layer 6 is made to change, and transmission and non-transmission of light are controlled.

The color filter substrate 5 includes an insulating substrate 501, and a color filter and black matrix BM in order. The color filter substrate 5 may be a color filter substrate generally used in the field of liquid crystal display devices.

As shown in FIGS. 8A, 8B and 9, the array substrate 4 includes, in the display region A, the scanning signal lines GL provided in the second metal layer 404, the video signal lines SL intersecting the scanning signal lines GL and provided in the third metal layer 407, and multiple pixel control TFTs 110P. A pixel electrode 101P is arranged in each region surrounded by two video signal lines SL adjacent to each other and two scanning signal lines GL adjacent to each other. Further, the common electrode 101C is arranged so as to cover the display region A.

Each pixel control TFT 110P is a three-terminal switch that is connected to a corresponding video signal line SL and scanning signal line GL among the video signal lines SL and the scanning signal lines GL, and that has the thin film semiconductor layer 406, a source electrode 110Pa constituted by a part of the corresponding video signal line SL, a gate electrode 110Pb constituted by a part of the corresponding scanning signal line GL (that is, electrically connected to the scanning signal line GL), and a drain electrode 110Pc electrically connected to the corresponding pixel electrode 101P among multiple pixel electrodes 101P. The drain electrode 110Pc and the source electrode 110Pa of the pixel control TFT 110P are provided in the third metal layer 407 (also referred to as a source metal layer), and the gate electrode 110Pb of the pixel control TFT 110P is provided in the second metal layer 404 (also referred to as a gate metal layer). The pixel electrode 101P is connected to the video signal line SL via the thin film semiconductor layer 406.

The array substrate 4 of the present embodiment further includes a first additional line L10 electrically connected to the gate electrode 10DG of the output control TFT 10D, and the first additional line L10 includes a first additional line portion L10P provided in the first metal layer 402 in the display region A. The first additional line portion L10P overlaps the scanning signal line GL via the first insulating layer 403 in the display region A. In such an aspect, an additional bootstrap capacitor can be formed between the first additional line portion L10P arranged in the first metal layer 402 and the scanning signal line GL arranged in the second metal layer 404, not in the gate driver 40 provided in the frame region N, but in the display region A. That is, the bootstrap capacitor region CapA can be provided, not in the gate driver 40 provided monolithically in the frame region N, but in the display region A. As a result, the frame region can be reduced, for example, by 59 μm. Further, since the region where the scanning signal line GL is arranged is originally a light shielding region, the first additional line portion L10P overlaps the scanning signal line GL in the display region A, whereby when the bootstrap capacitor is formed in the display region A, the decrease in the aperture ratio of the display region A can be suppressed. The details of the present embodiment will be described below.

Figure 10:
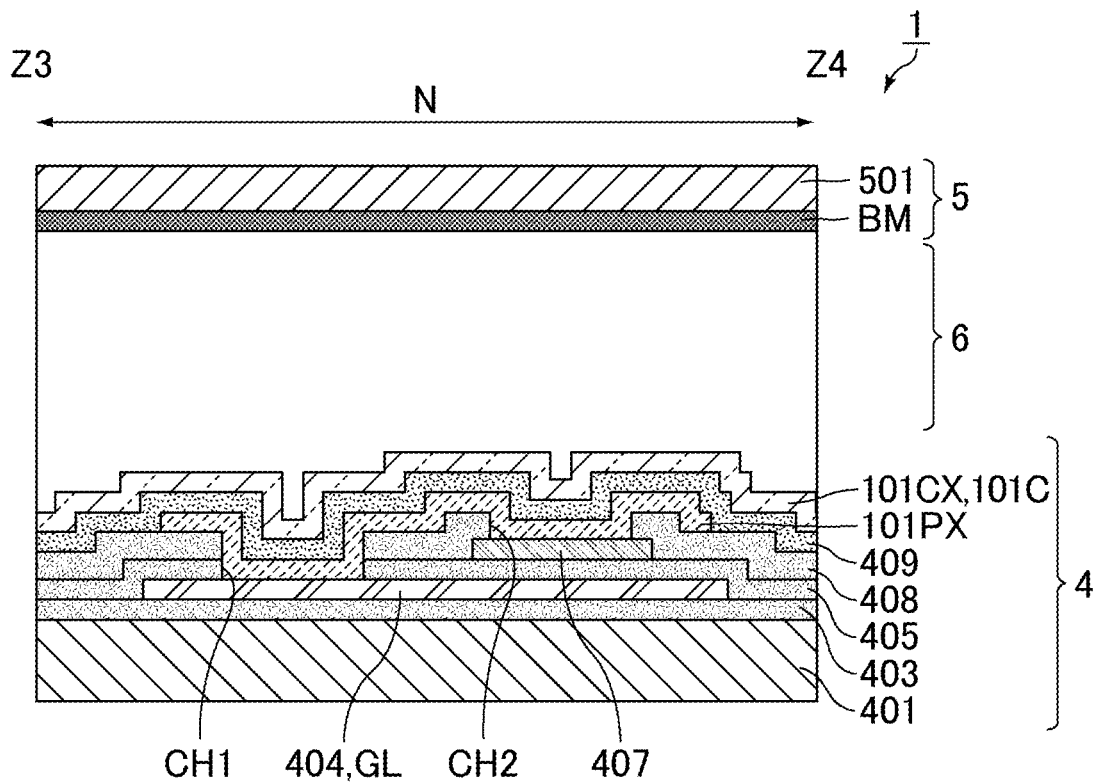
FIG. 10 is a schematic cross-sectional view of a display region of the liquid crystal display device of Embodiment 1 and a periphery of contact holes provided between common main lines.

FIG. 10 is a schematic cross-sectional view showing a periphery of the contact holes provided between the display region and the common main line of the liquid crystal display device of Embodiment 1. FIG. 10 is a schematic cross-sectional view taken along line Z3-Z4 of FIGS. 8A and 8B. The scanning signal line GL is extended from the display region A to the frame region N in the second metal layer 404, and is arranged in the third metal layer 407 via the same first transparent conductive layer 101PX as the pixel electrode 101P and is electrically connected to the drain electrode 10DD of the output control TFT 10D arranged in the third metal layer 407. The portion arranged in the first transparent conductive layer 101PX is electrically connected to a portion arranged in the second metal layer 404 and a portion arranged in the third metal layer 407 via the two contact holes CH1 and CH2 provided between the display region A and the main line L32.

As shown in FIGS. 8A and 8B, the first additional line L10 is extended from the display region A to the frame region N in the first metal layer 402 and electrically connected to the gate electrode 10DG of the output control TFT 10D arranged in the second metal layer 404 via the contact hole CH3 provided between the main line L32 and the output control TFT 10D.

The first additional line L10 is arranged in parallel with the scanning signal line GL, and has the same shape as the scanning signal line GL. The first additional line L10 is linear, and is arranged across multiple display units P. One first additional line L10 is provided corresponding to each unit circuit 10B. Also, one first additional line L10 is provided corresponding to each scanning signal line GL.

The first additional line L10 may only have the first additional line portion L10P overlapping the scanning signal line GL, one part of the first additional line L10 may overlap the scanning signal line GL and the other part may not overlap the scanning signal line GL, and preferably, the first additional line does not protrude from the scanning signal line GL in the display region A. Since the first additional line L10 is electrically connected to the gate electrode 10DG of the output control TFT 10D, the first additional line L10 receives the set signal SET from the unit circuit 10B of a stage two stages before in the period different from the period in which the unit circuit 10B provided with the output control TFT 10D outputs the on-signal. By provision of the first additional line L10 without protruding from the scanning signal line GL, electric field leakage (alignment disorder of liquid crystal molecules in the display region A) caused by the set signal SET can be prevented.

The length of the first additional line L10 is not particularly limited, and can be appropriately set according to the required capacitance of the bootstrap capacitor, but the first additional line L10 preferably intersects at least one of the video signal lines SL, and more preferably intersects two or more video signal lines SL. In such an aspect, the capacitance of the bootstrap capacitor can be increased. However, the first additional line L10 may not intersect the video signal line SL, and even in such a case, the bootstrap capacitor Cap can be formed in the display region A. For example, the length of the first additional line L10 extended from the gate driver 40 located on the right side of the paper surface of FIG. 1 may be less than that of one display unit, and in this case, the number of intersections is zero.

As shown in FIGS. 8A and 8B, the array substrate 4 further includes a second additional line L20 arranged with a gap portion GAP1 provided between the first additional line L10 and the second additional line L20. The second additional line L20 includes a second additional line portion L20P provided in the first metal layer 402 in the display region A, and is not electrically connected to the gate electrode 10DG of the output control TFT 10D and is arranged at a position farther from the gate driver 40 than the first additional line L10 is. Then, the second additional line portion L20P overlaps the scanning signal line GL in the display region A via the first insulating layer 403. Since the cross-sectional shape of the pixel control TFT 110P portion (for example, the taper shape of the gate insulating layer as the second insulating layer 405) differs depending on the presence or absence of the pattern of the lower layer of the gate metal layer which is the second metal layer 404, variations may occur in the characteristics of the pixel control TFT 110P. However, in the present embodiment, by provision of the second additional line portion L20P in the display region A, a change in the pattern of the lower layer of the second metal layer 404 is suppressed, and variations in the characteristics of the pixel control TFT 110P can be suppressed.

The second additional line L20 is arranged in parallel with the scanning signal line GL and has the same shape as the scanning signal line GL. The second additional line L20 is linear and is arranged across the display units P. One second additional line L20 is arranged corresponding to each unit circuit 10B. Further, one second additional line L20 is provided corresponding to each scanning signal line GL.

The second additional line L20 may have the second additional line portion L20P overlapping the scanning signal line GL, and one part of the second additional line L20 may overlap the scanning signal line GL, and the other part may not overlap the scanning signal line GL.

The second additional line L20 preferably intersects at least one of the video signal lines SL, and more preferably intersects two or more video signal lines SL. In such an aspect, the characteristics of multiple TFTs can be made more uniform.

The gap portion GAP1 provided between the first additional line L10 and the second additional line L20 is preferably provided at a position not overlapping the pixel control TFT 110P. In such an aspect, the variation in the cross-sectional shape of the region in which the pixel control TFT 110P is provided can be suppressed, and the number of pixel control TFTs 110P out of characteristics can be suppressed.

Each scanning signal line GL overlaps the first additional line L10 in the frame region N on the left side and in the left side part of the display region A excluding the middle part, overlaps the second additional line L20 in the middle part of the display region A via the gap portion GAP1, and further overlaps the first additional line L10 in the right side part of the display region A excluding the middle part and the frame region N on the right side via the gap portion GAP1. In this manner, substantially the entire region in the lengthwise direction (longitudinal direction) of each scanning signal line GL except at least two gap portions GAP1 preferably overlaps the first additional line L10 or the second additional line L20.

Figure 11:
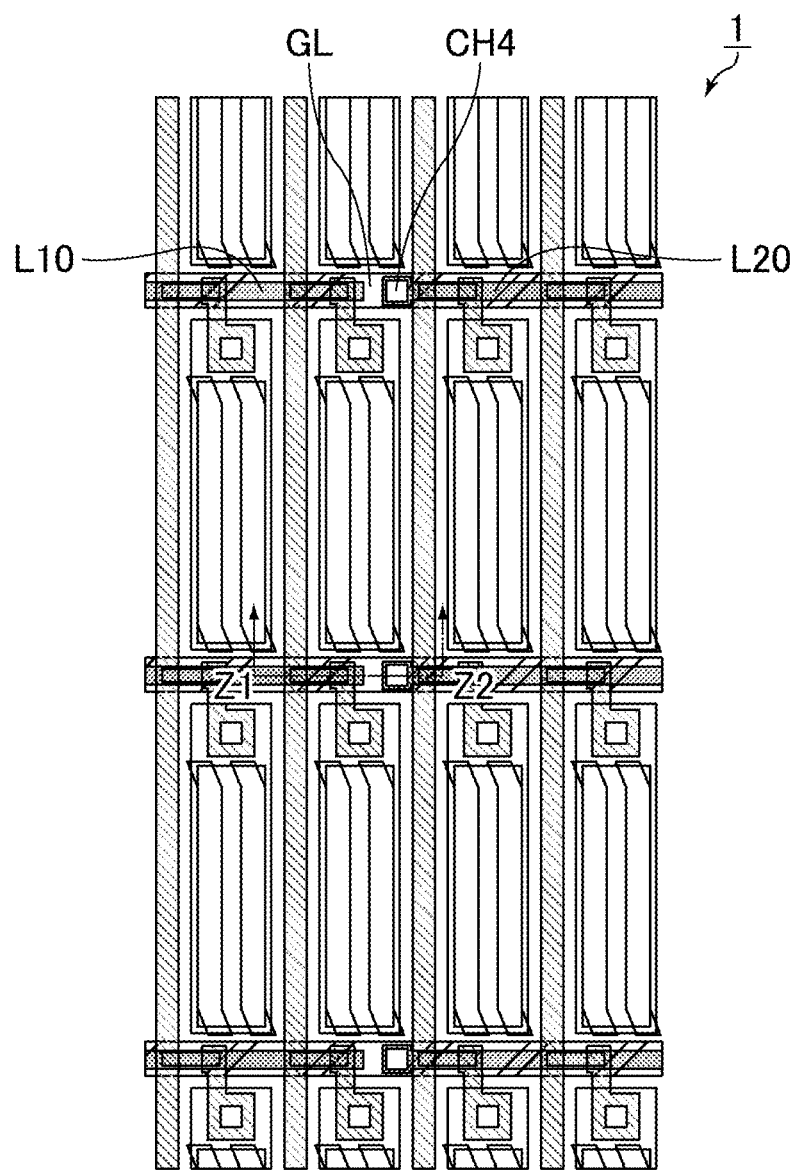
FIG. 11 is a schematic plan view for describing a contact between a scanning signal line and a second additional line provided in the liquid crystal display device of Embodiment 1.
Figure 12:
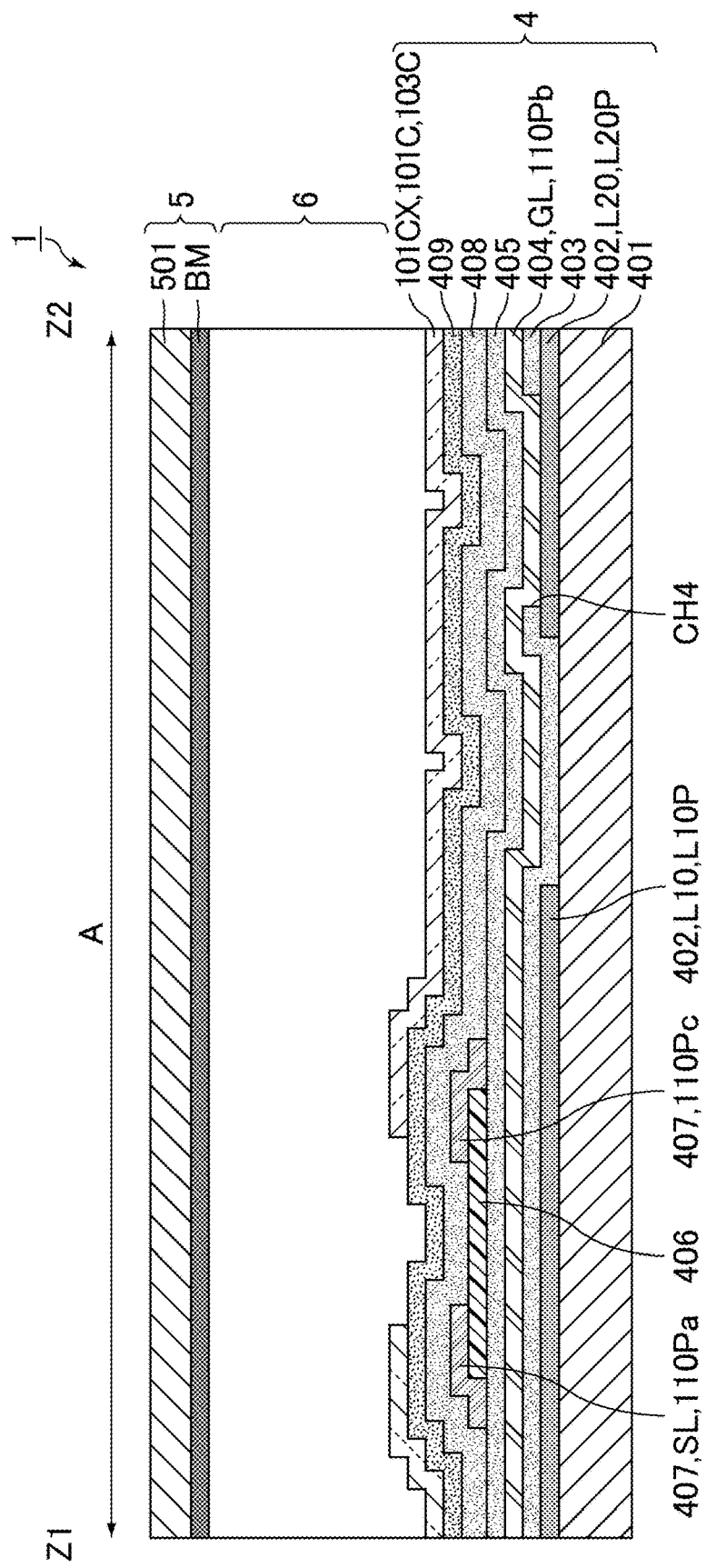
FIG. 12 is a schematic cross-sectional view showing a periphery of a pixel control TFT provided in the liquid crystal display device of Embodiment 1.

FIG. 11 is a schematic plan view for describing the contact between the scanning signal line and the second additional line provided in the liquid crystal display device of Embodiment 1. FIG. 12 is a schematic cross-sectional view showing a periphery of the pixel control TFT provided in the liquid crystal display device of Embodiment 1. FIG. 12 is a schematic cross-sectional view taken along line Z1-Z2 of FIG. 11. The second additional line L20 is electrically connected to the scanning signal line GL having a portion overlapping the second additional line L20. More specifically, as shown in FIGS. 11 and 12, the second additional line L20 is electrically connected to the scanning signal line GL having a portion overlapping the second additional line L20 via at least two contact holes CH4 provided in the first insulating layer 403 at both ends of the second additional line L20. In such an aspect, the second additional line L20 can be used as a redundant line of the scanning signal line GL. The configuration in which the second additional line L20 is used as a redundant line of the scanning signal line GL is effective, for example, for a large panel in which the scanning signal line GL is long.

By arranging the second additional line L20, for example, the taper shapes of the gate insulating layers can be made the same between a portion where the first additional line L10 is arranged and a portion where the second additional line L20 is arranged. From such a viewpoint, the second additional line L20 preferably follows the arrangement of the first additional line L10 (arranged in the same manner as the first additional line L10).

Preferably, the second additional line L20 does not protrude from the scanning signal line GL in the display region A. In such an aspect, the decrease of an aperture ratio can be suppressed. Further, the influence of the electric field from the scanning signal line GL to the liquid crystal layer 6 can be suppressed.

Figure 13:
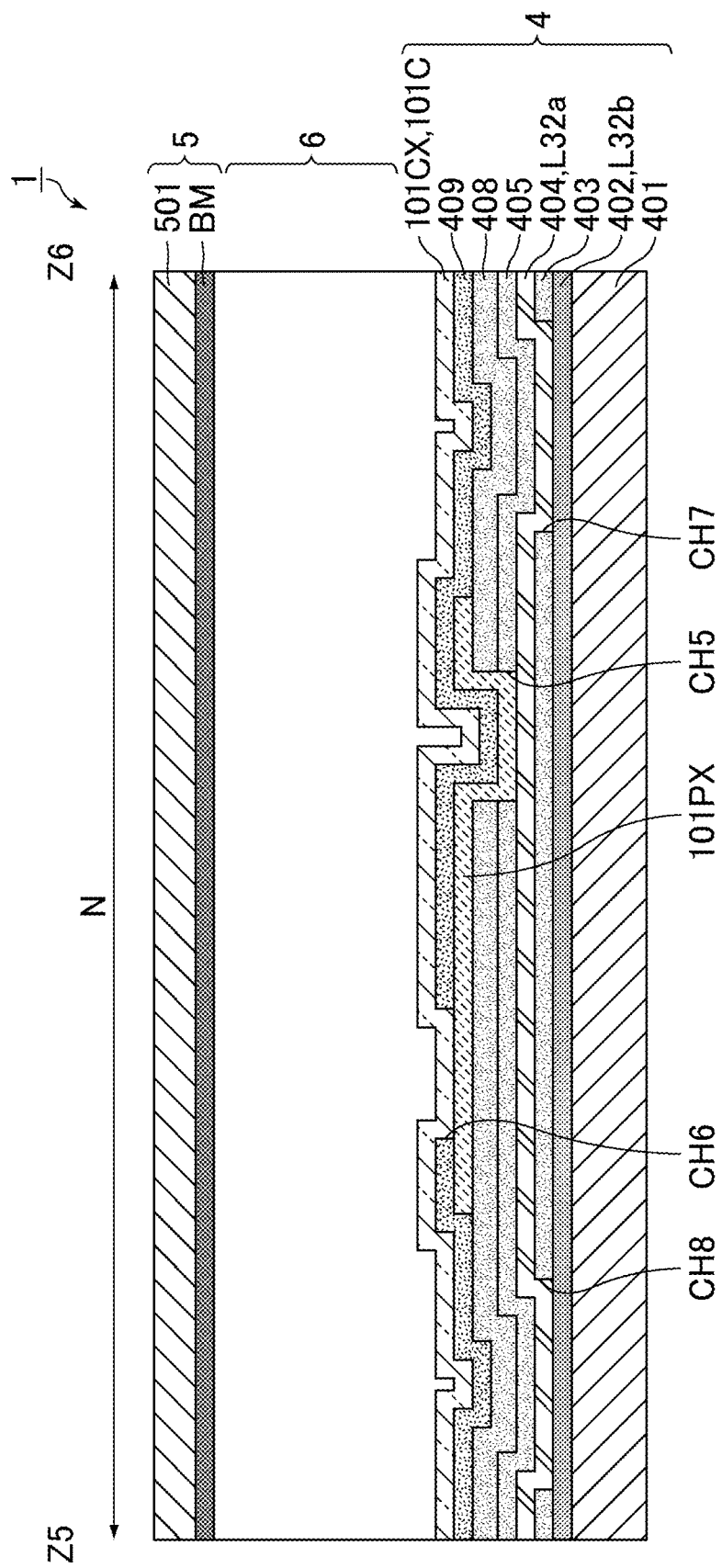
FIG. 13 is a schematic cross-sectional view showing a periphery of contact holes provided in a region where a common main line of the liquid crystal display device of Embodiment 1 is arranged.

FIG. 13 is a schematic cross-sectional view showing a periphery of the contact holes provided in the region where the common main line of the liquid crystal display device of Embodiment 1 is arranged. FIG. 13 is a schematic cross-sectional view taken along line Z5-Z6 in FIGS. 8A and 8B. As shown in FIGS. 8A, 8B and 13, the array substrate 4 includes the common electrode 101C which also functions as the conductive member 103C including the capacitor forming portion 103CP and the main line L32 provided to surround the display region A in the frame region N.

The scanning signal line GL intersects the main line L32 in the frame region N and is extended to the output control TFT 10D, and the main line L32 has a neck portion L51 in a region intersecting the scanning signal line GL. By provision of the first additional line L10, the capacitance of the main line L32 may be increased, but the capacitance can be reduced by provision of the neck portion L51 in the main line L32.

The main line L32 has a multilayer structure including a conductive line portion L32a provided in the second metal layer 404 and a conductive line portion L32b provided in the first metal layer 402. By provision of the first additional line L10, the capacitance of the main line L32 may be increased, but the resistance of the main line L32 can be reduced by the multilayer structure of the main line L32.

The main line L32 is electrically connected to the common electrode 101C arranged in the second transparent conductive layer 101CX via the first transparent conductive layer 101PX from the conductive line portion L32a provided in the second metal layer 404. The portion arranged in the first transparent conductive layer 101PX is electrically connected to the conductive line portion L32a provided in the second metal layer 404 via the contact hole CH5 provided in the second insulating layer 405 and the third insulating layer 408, and is electrically connected to the common electrode 101C arranged in the second transparent conductive layer 101CX via the contact hole CH6 provided in the fourth insulating layer 409.

The conductive line portion L32b provided in the first metal layer 402 is electrically connected to the conductive line portion L32a provided in the second metal layer 404 via two contact holes CH7 and CH8 provided in the first insulating layer 403.

Embodiment 2

In the present embodiment, characteristics peculiar to the present embodiment will mainly be described, and description of contents overlapping with the above embodiment will be omitted. The second additional line L20 in Embodiment 1 is electrically connected to the scanning signal line GL, but a second additional line L20 in the present embodiment is not electrically connected to a scanning signal line GL.

Figure 14:
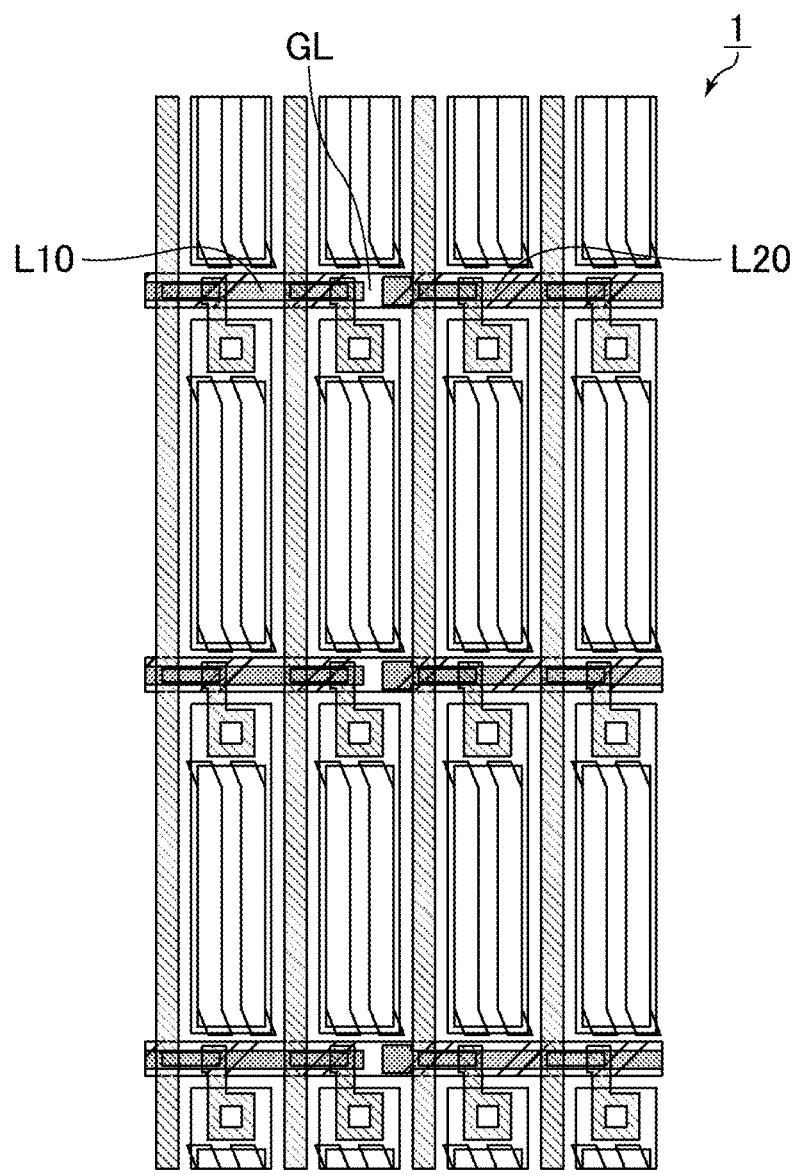
FIG. 14 is a schematic plan view for describing a contact between a scanning signal line and a second additional line provided in a liquid crystal display device of Embodiment 2.
Figure 15:
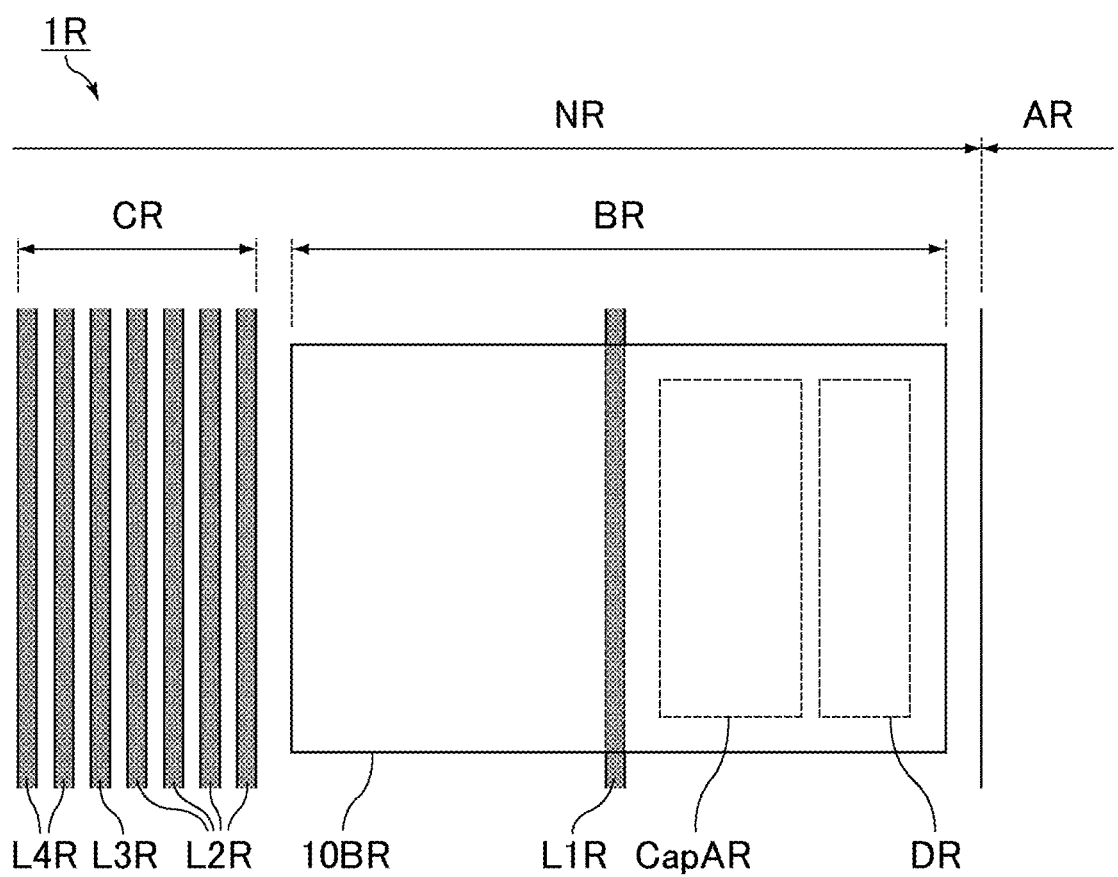
FIG. 15 is a schematic plan view showing a periphery of a unit circuit provided in a gate driver of a liquid crystal display device of Comparative Embodiment 1.

FIG. 14 is a schematic plan view for describing a contact between a scanning signal line and a second additional line provided in a liquid crystal display device of Embodiment 2. As shown in FIG. 14, the second additional line L20 is not electrically connected to the scanning signal line GL overlapping with the second additional line L20. When the pixel size is small, providing a contact hole may be difficult in securing the aperture ratio. In such a case, the reduction of an aperture ratio can be further suppressed by keeping the second additional line L20 and the scanning signal line GL in a floating state without electrically connecting the second additional line L20 and the scanning signal line GL as in the present embodiment. In the small high definition panel, the variation of the TFT characteristics can be suppressed by arranging the second additional line L20 not electrically connected to the scanning signal line GL.

By arranging the second additional line L20, for example, the taper shapes of the gate insulating layers can be made the same between a portion where the first additional line L10 is arranged and a portion where the second additional line L20 is arranged. From such a viewpoint, the second additional line L20 preferably follows the arrangement of the first additional line L10 (arranged in the same manner as the first additional line L10).

Preferably, the second additional line L20 does not protrude from the scanning signal line GL in the display region A. In such an aspect, the decrease of an aperture ratio can be suppressed. In addition, even if the second additional line L20 is in a floating state, if the second additional line L20 protrudes extremely far from the scanning signal line GL, the electric field from the scanning signal line GL to a liquid crystal layer 6 may be affected. Therefore, preferably, the second additional line L20 does not protrude from the scanning signal line GL.

Modification 1

In the above embodiments, the gate drivers 40 are respectively arranged in the left and right frame regions N via the display region A, and the liquid crystal display device 1 includes the two gate drivers 40. However, the gate driver 40 may be arranged only in the frame region N on one side of the display region A, and the number of gate drivers 40 provided in the liquid crystal display device 1 may be one. For example, when one gate driver 40 is arranged in the left frame region N, each scanning signal line GL overlaps a first additional line L10 in the left frame region N and the left side part of the display region A, and overlaps a second additional line L20 in the right side part of the display region A via a gap portion GAP1. Thus, in the case where one gate driver 40 is provided, substantially the entire region in the lengthwise direction (longitudinal direction) of each scanning signal line GL except for at least one gap portion GAP1 preferably overlaps the first additional line L10 or the second additional line L20.

Modification 2

In the present embodiment, the liquid crystal display device 1 has been described by taking the liquid crystal display device in the FFS mode as an example, but the display mode of the liquid crystal display device is not particularly limited. Examples of the display modes other than the FFS mode include an in-plane switching (IPS) mode in which liquid crystal molecules are horizontally aligned with respect to the substrate surface to apply a lateral electric field to the liquid crystal layer, a twisted nematic (TN) mode in which liquid crystal molecules having positive anisotropy of dielectric constant are aligned in the state of being twisted by 90° when viewed from a substrate normal direction, and a vertical alignment (VA) mode in which liquid crystal molecules having negative anisotropy of dielectric constant are aligned vertically with respect to the substrate surface. In the liquid crystal display device in the IPS mode, a pixel electrode 101P and a common electrode 101C provided on an array substrate 4 each have a comb-like electrode portion provided in a comb shape, and the comb-like electrode portions provided in the pixel electrode 101P and the common electrode 101C are alternately arranged so as to mesh with each other. In the liquid crystal display device in the IPS mode, the pixel electrode 101P and the common electrode 101C may be provided in different layers via an insulating layer, or may be provided in the same layer. In the liquid crystal display devices in the TN mode and the VA mode, the common electrode 101C is arranged on a color filter substrate 5.

Modification 3

Although a liquid crystal display device using an InGaZnO oxide semiconductor for the thin film semiconductor layer 406 has been described in the above embodiment, amorphous silicon (a-Si) may be employed instead of the InGaZnO oxide semiconductor.

Modification 4

In the above embodiment, the aspect in which the bootstrap capacitor region CapA is not provided in the frame region N but is provided in the display region A has been described. Here, in an output control transistor region D, a drain electrode 10DD and a source electrode 10DS of an output control TFT 10D are provided on a third metal layer 407, and a gate electrode 10DG of the output control TFT 10D is provided on a second metal layer 404. Therefore, not only in a display region A but also in the output control transistor region D, a bootstrap capacitor region CapA can be provided by using the second metal layer 404 and the third metal layer 407. Therefore, depending on the size of the frame region N, the driving voltage, the number of pixels, and the pixel size, a bootstrap capacitor region CapA may be provided in the frame region N in addition to the bootstrap capacitor region CapA provided in the display region A.

Modification 5

In the liquid crystal display device 1 of the above embodiment, the first metal layer 402, the first insulating layer 403, the second metal layer 404, the second insulating layer 405, and the third metal layer 407 are sequentially stacked from the insulating substrate 401 side of the array substrate 4, and a TFT having a reverse stagger structure is employed. However, the third metal layer 407, the second insulating layer 405, the second metal layer 404, the first insulating layer 403, and the first metal layer 402 may be sequentially stacked from the insulating substrate 401 side of the array substrate 4, and a TFT having a positive stagger structure may be employed.

Modification 6

Although the liquid crystal display device 1 is described as an example of the image display device in the above embodiment, the image display device is not limited thereto. Examples of the image display device other than the liquid crystal display device include an image display device such as electronic paper and an organic EL (Electroluminescence) display.

What is claimed is:

1. An image display device comprising:
a substrate;
a display region that includes multiple display units arranged in a matrix and displays an image; and
a frame region that is a region outside the display region, wherein the substrate includes:
an insulating substrate;
a first metal layer, a first insulating layer, a second metal layer, a second insulating layer, and a third metal layer stacked in the stated order on the insulating substrate;
a pixel electrode provided in the display region;
a pixel control transistor provided in the display region and electrically connected to the pixel electrode;
a scanning signal line electrically connected to a gate electrode of the pixel control transistor; and
a gate driver provided monolithically on the insulating substrate in the frame region and configured to drive the scanning signal line,
the gate driver includes a unit circuit including:
a clock terminal to which a clock signal is input;
an output terminal electrically connected to the scanning signal line and configured to output a scanning signal to the scanning signal line; and
an output control transistor with one of a source electrode and a drain electrode connected to the clock terminal, and the other of the source electrode and the drain electrode connected to the output terminal,
a drain electrode and a source electrode of the pixel control transistor are provided in the third metal layer,
the gate electrode of the pixel control transistor is provided in the second metal layer,
the scanning signal line is provided in the second metal layer in the display region,
the substrate further includes a first additional line electrically connected to a gate electrode of the output control transistor,
the first additional line includes a first additional line portion provided in the first metal layer in the display region, and
the first additional line portion overlaps the scanning signal line in the display region via the first insulating layer.

2. The image display device according to claim 1, wherein the first additional line does not protrude from the scanning signal line in the display region in a plan view.

3. The image display device according to claim 1, wherein the substrate further includes multiple video signal lines intersecting the scanning signal line, and the first additional line portion intersects at least one of the video signal lines.

4. The image display device according to claim 1, wherein the substrate further includes a second additional line that includes a second additional line portion provided in the first metal layer in the display region and is arranged with a gap portion provided between the first additional line and the second additional line,
the second additional line is not electrically connected to the gate electrode of the output control transistor, and is arranged at a position farther from the gate driver than the first additional line is, and
the second additional line portion overlaps the scanning signal line in the display region via the first insulating layer.

5. The image display device according to claim 4, wherein the substrate further includes multiple video signal lines intersecting the scanning signal line, and the second additional line portion intersects at least one of the video signal lines.

6. The image display device according to claim 4, wherein the second additional line is not electrically connected to the scanning signal line.

7. The image display device according to claim 4, wherein the second additional line is electrically connected to the scanning signal line.

8. The image display device according to claim 4, wherein the gap portion is provided at a position not overlapping the pixel control transistor.

9. The image display device according to claim 1, wherein the substrate further includes a conductive member including a capacitor forming portion that overlaps the pixel electrode in the display region to form an auxiliary capacitor, and
a main line provided in the frame region and electrically connected to the conductive member, and
the scanning signal line intersects the main line in the frame region.

10. The image display device according to claim 9, wherein the main line has a neck portion in a region intersecting the scanning signal line.

11. The image display device according to claim 9, wherein the main line has a multilayer structure including at least a conductive line portion provided in the first metal layer.

12. The image display device according to claim 1, which is a liquid crystal display device.

* * * * *